United States Patent Office 3,420,392
Patented Jan. 7, 1969

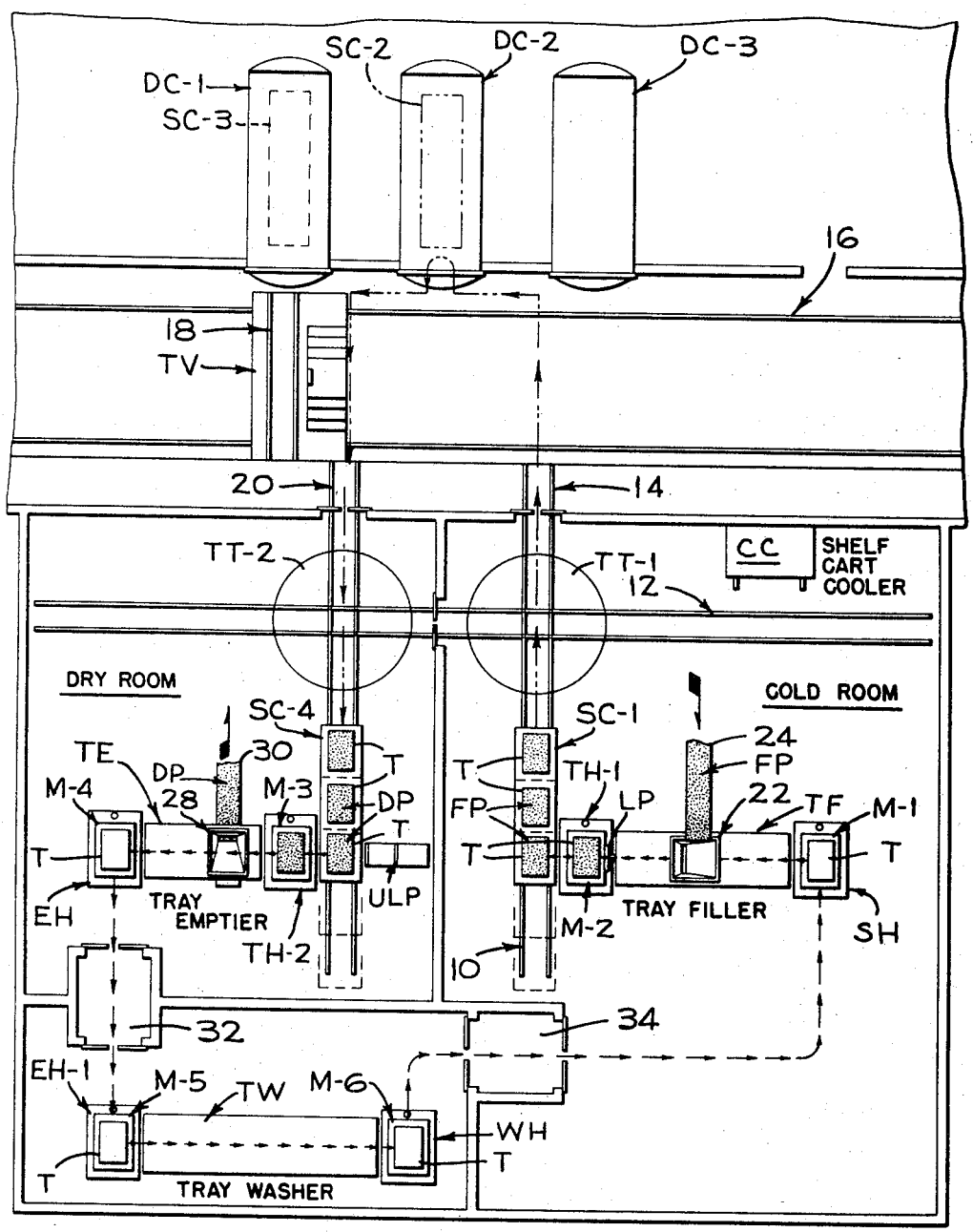
FIG_1

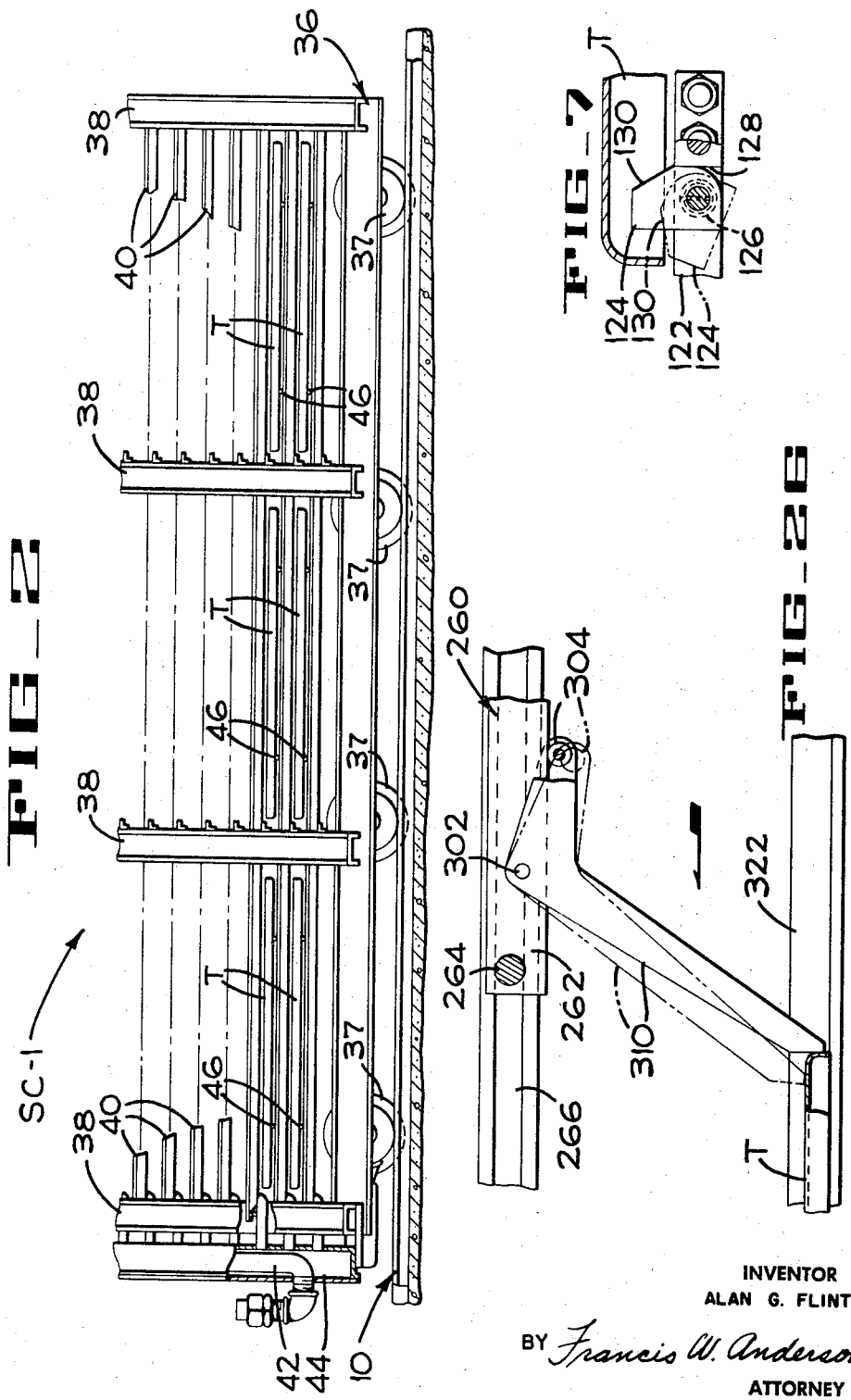

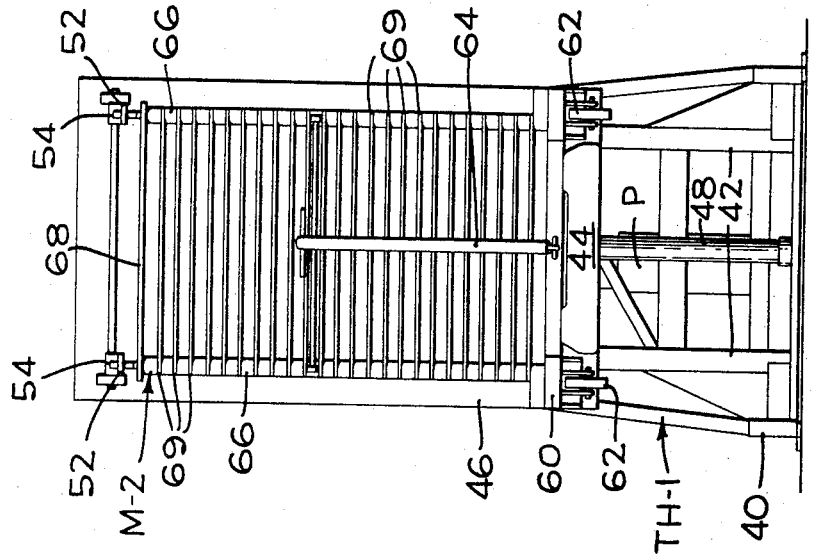
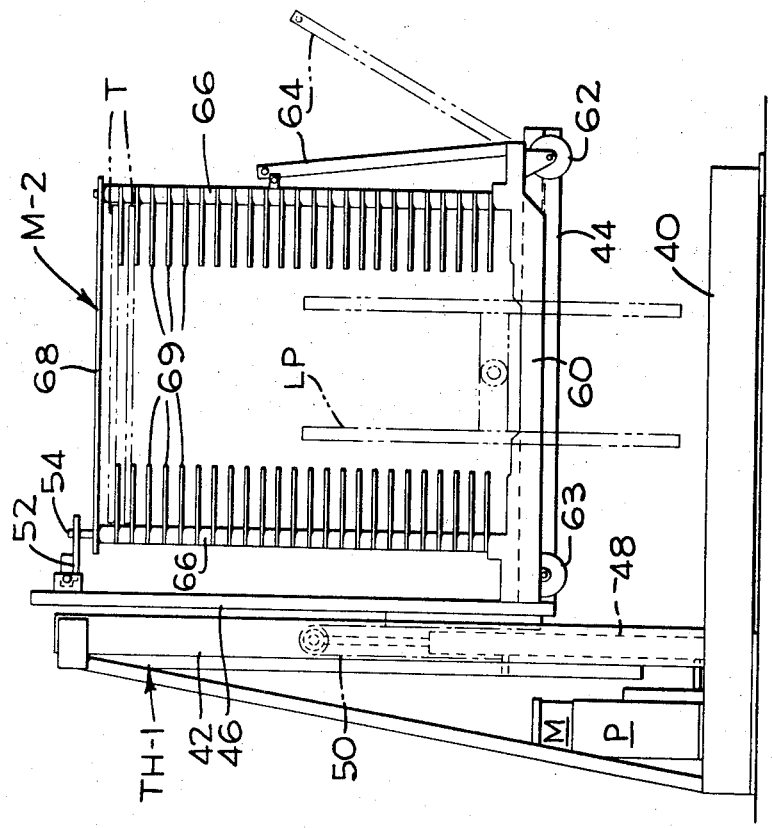

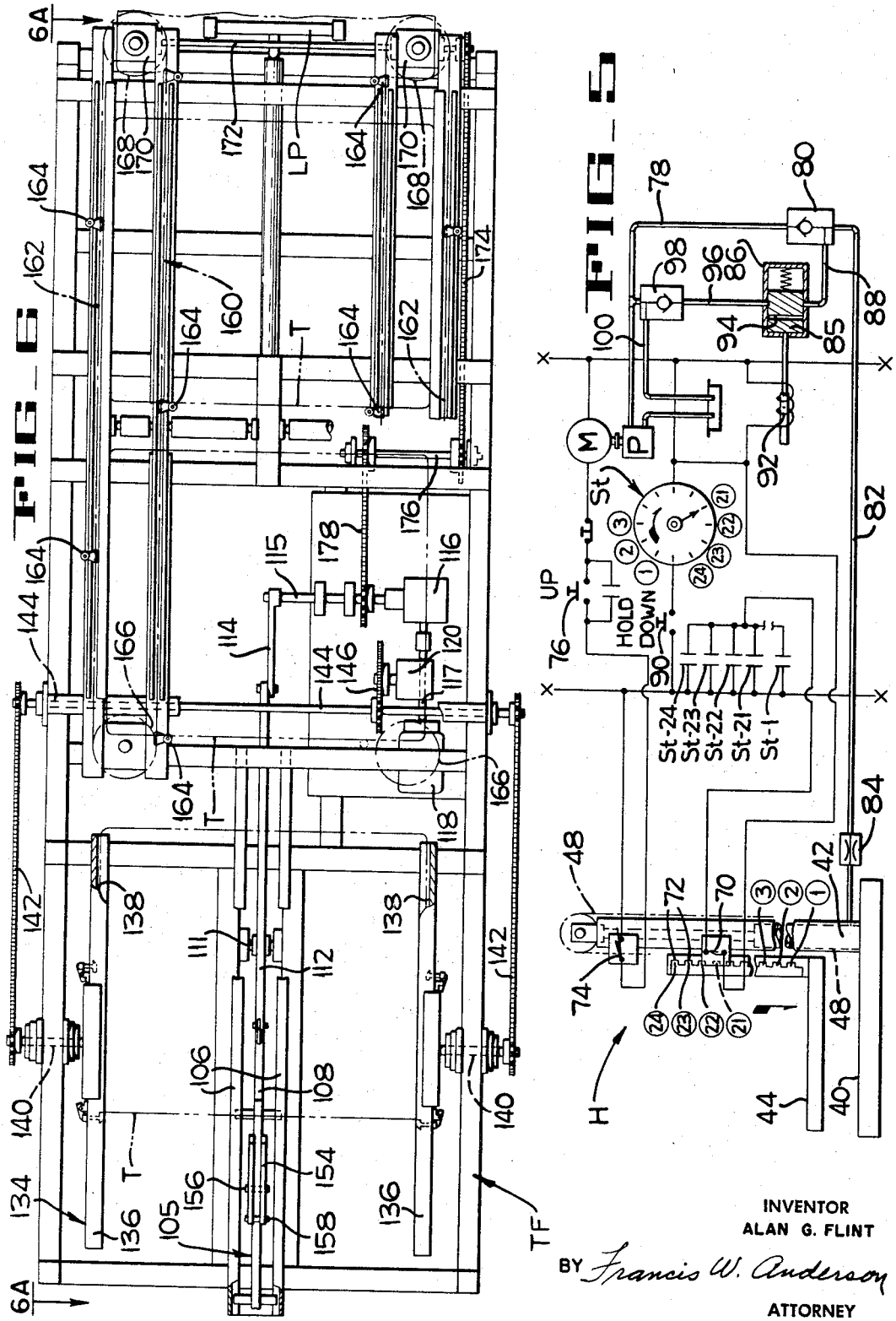

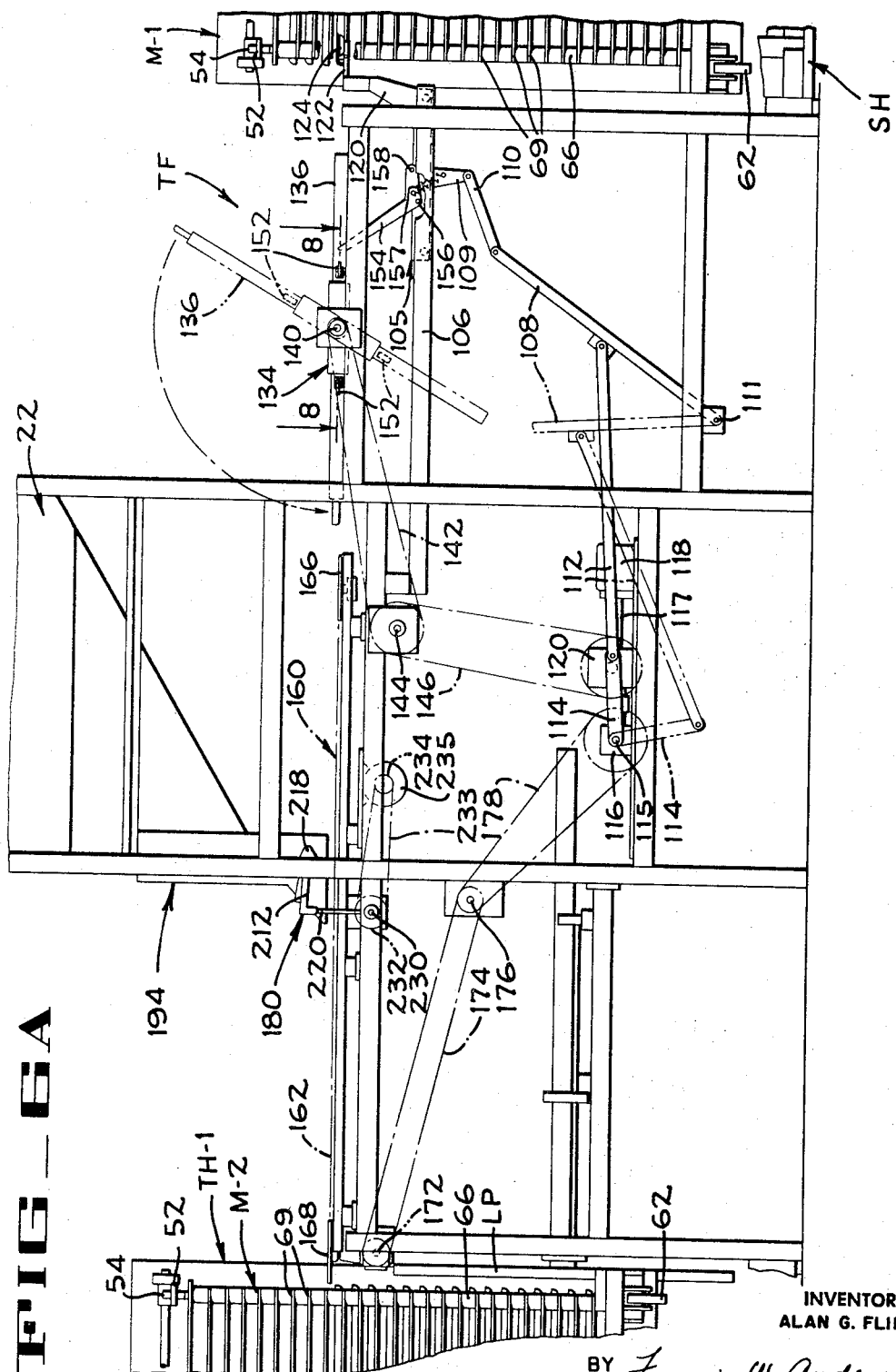

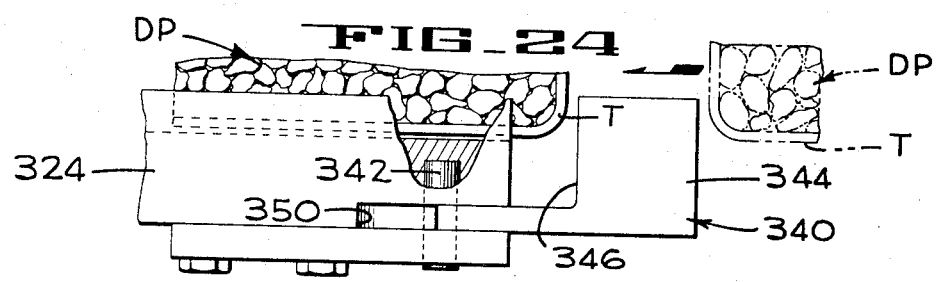
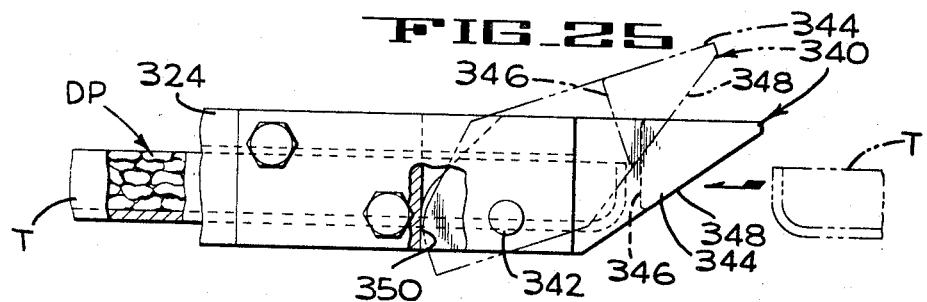
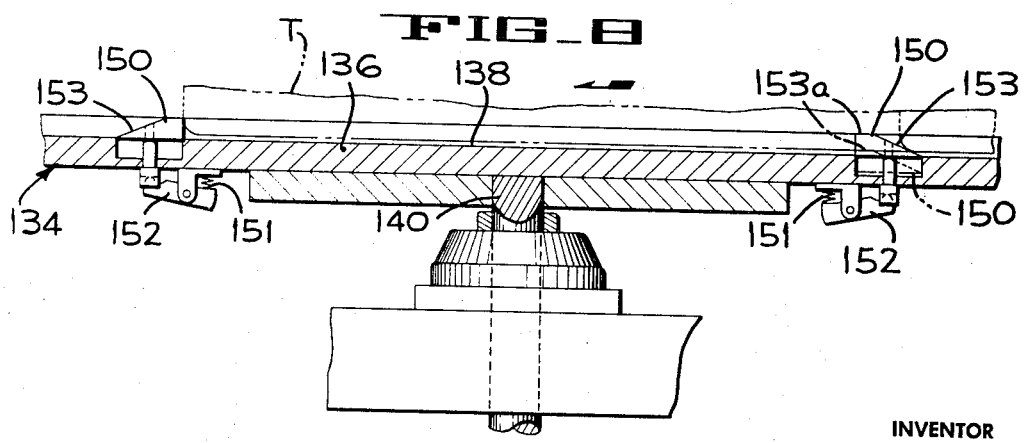

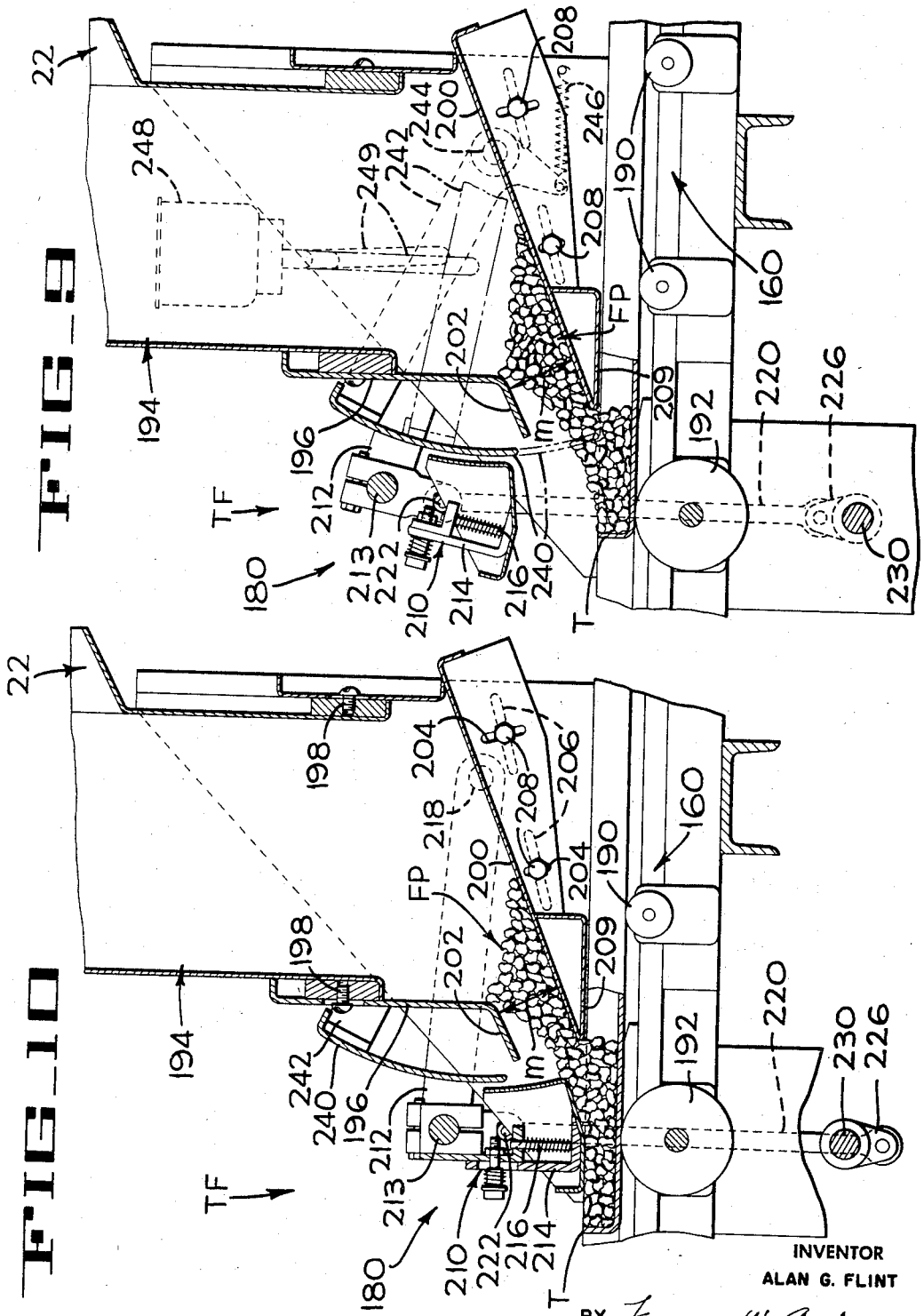

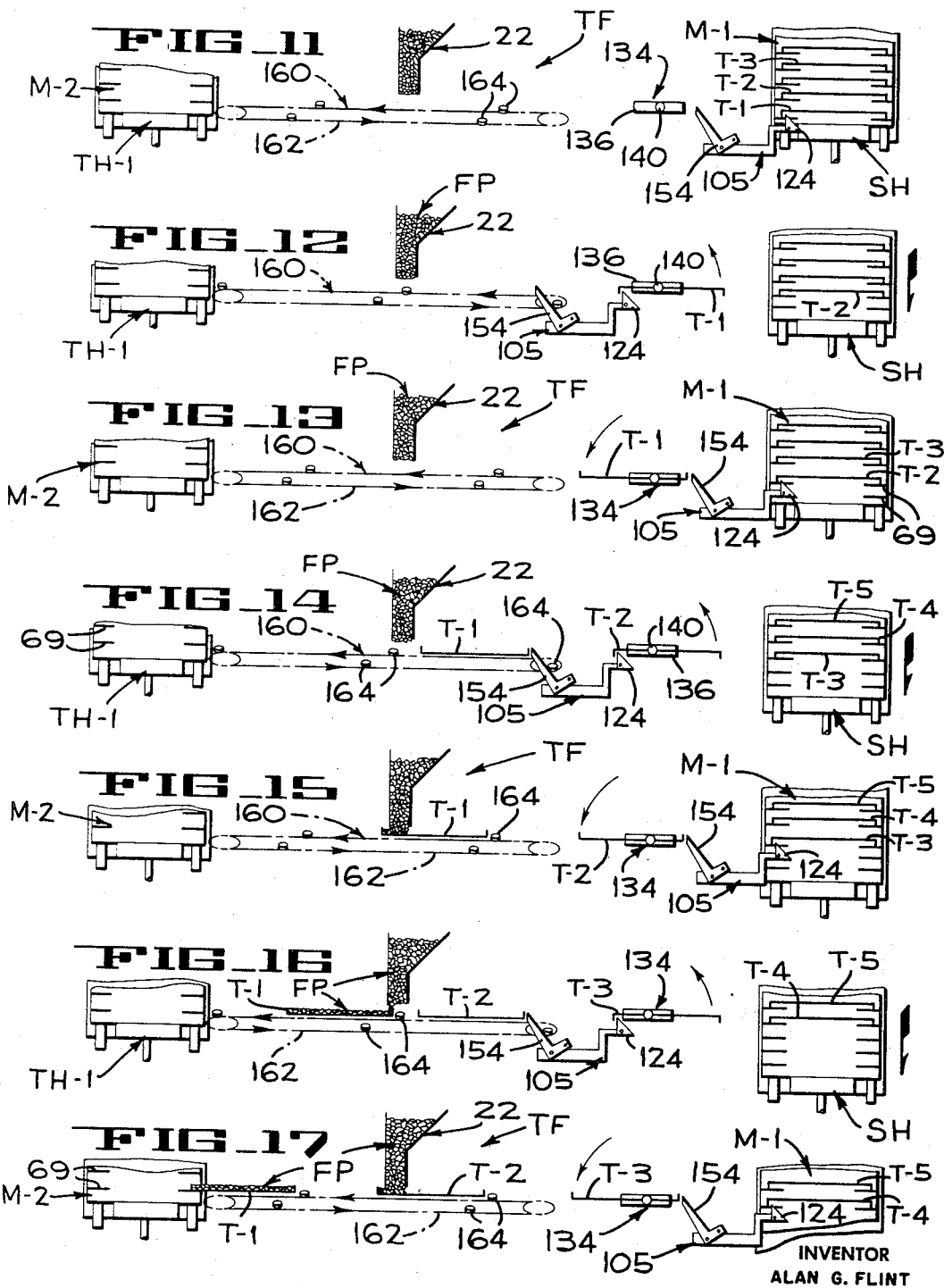

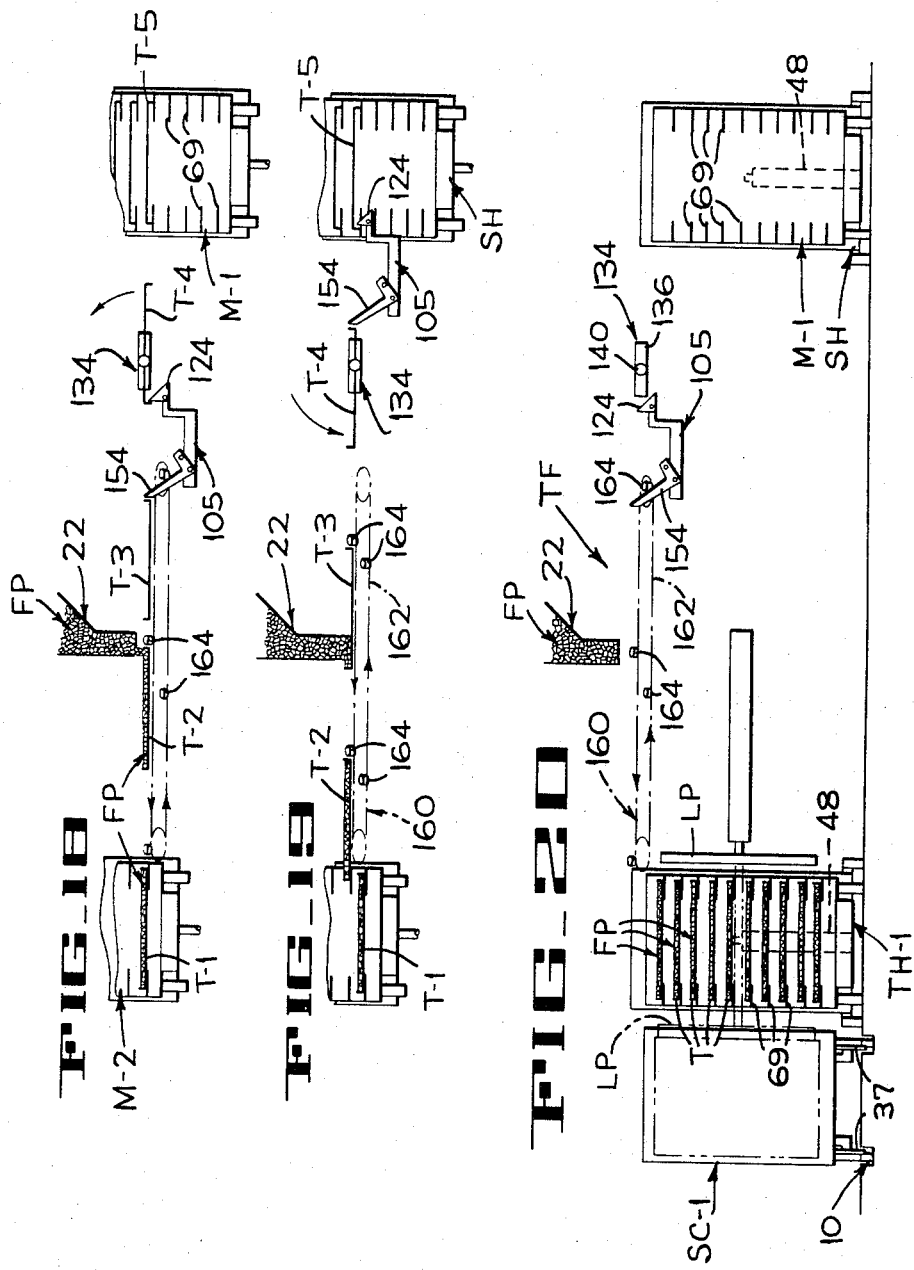

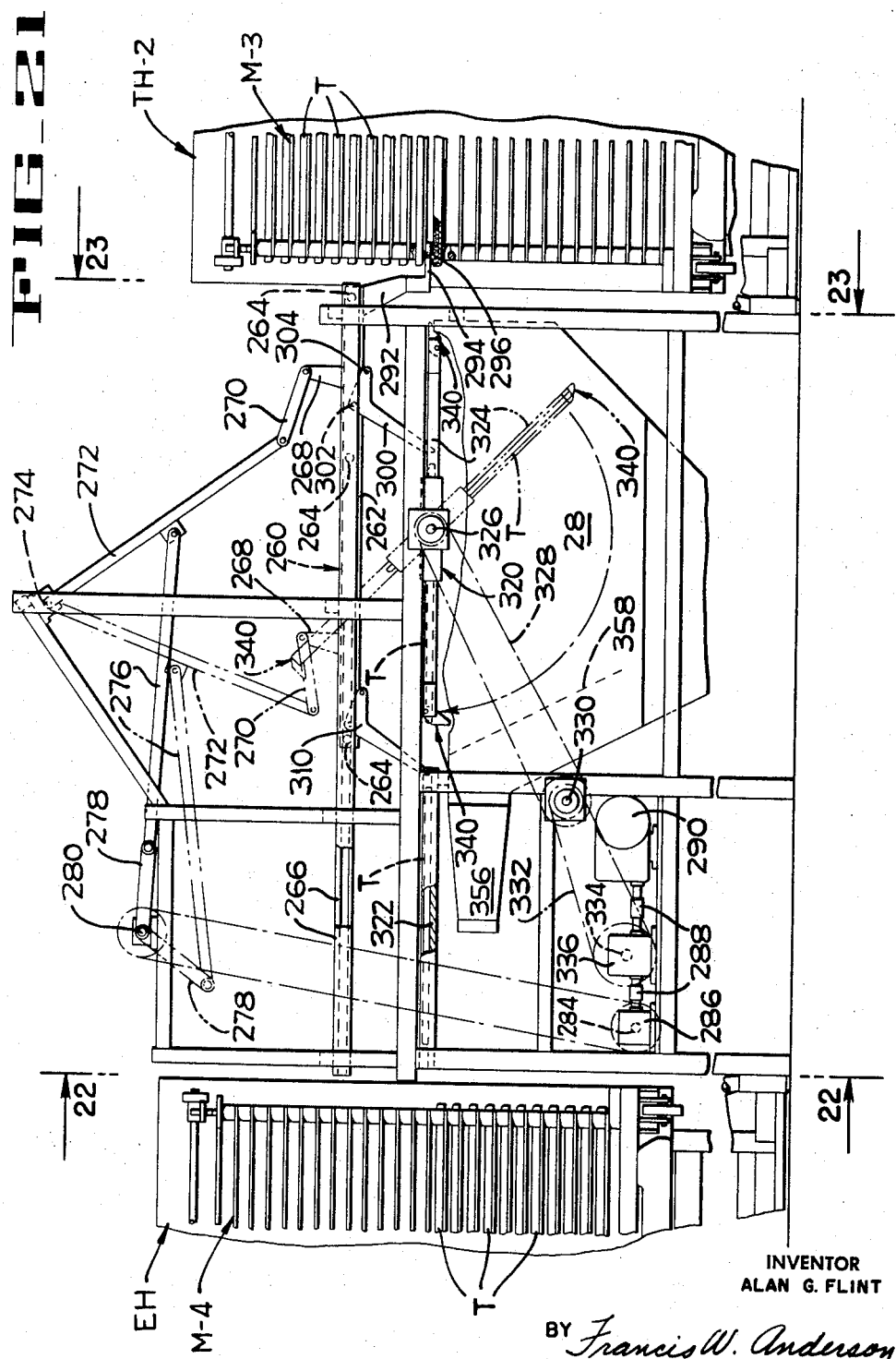

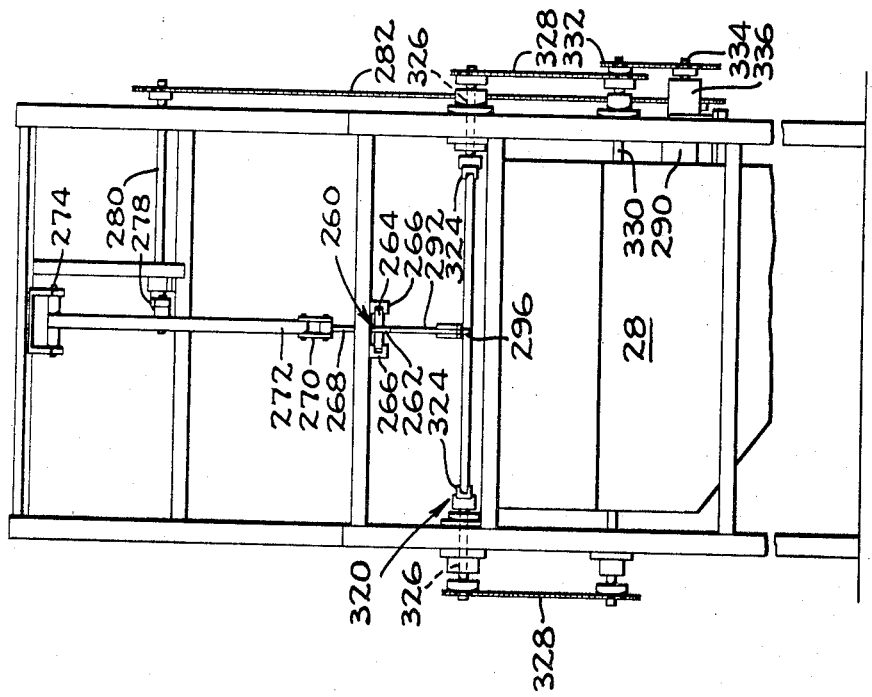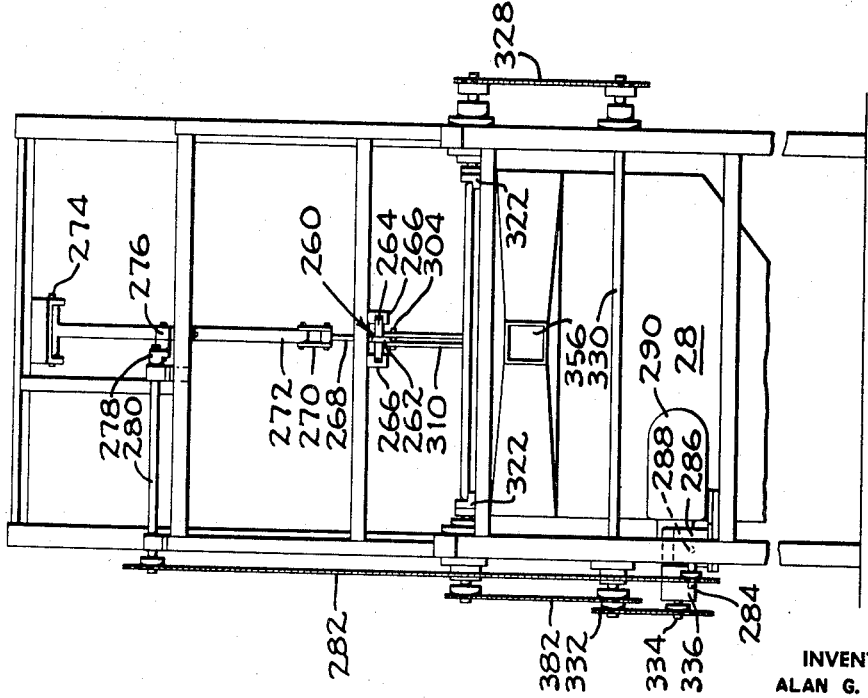

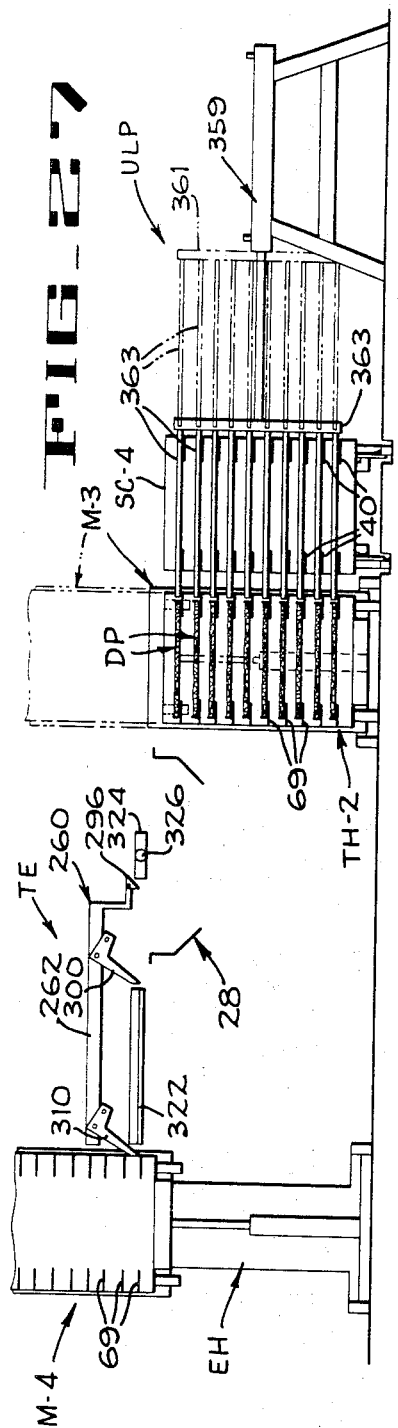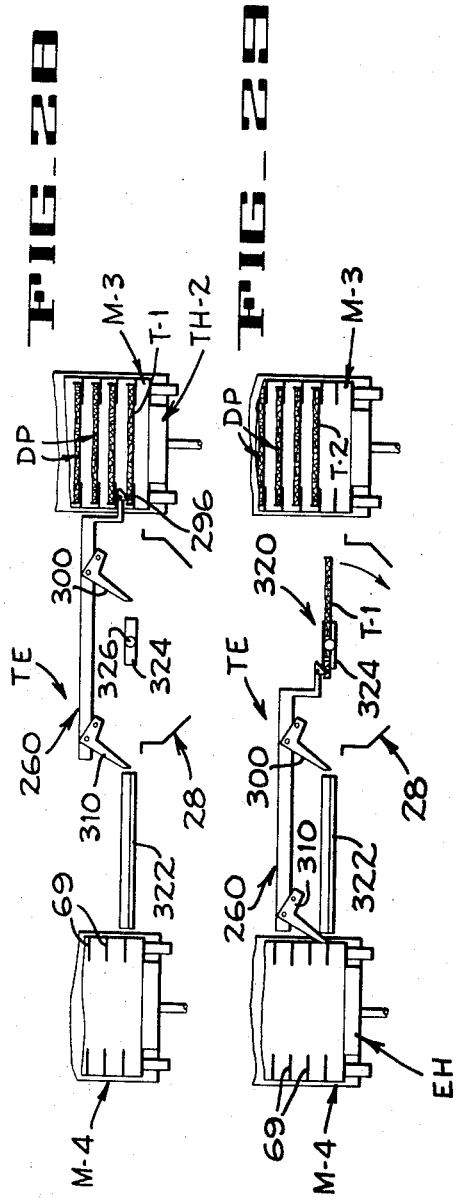

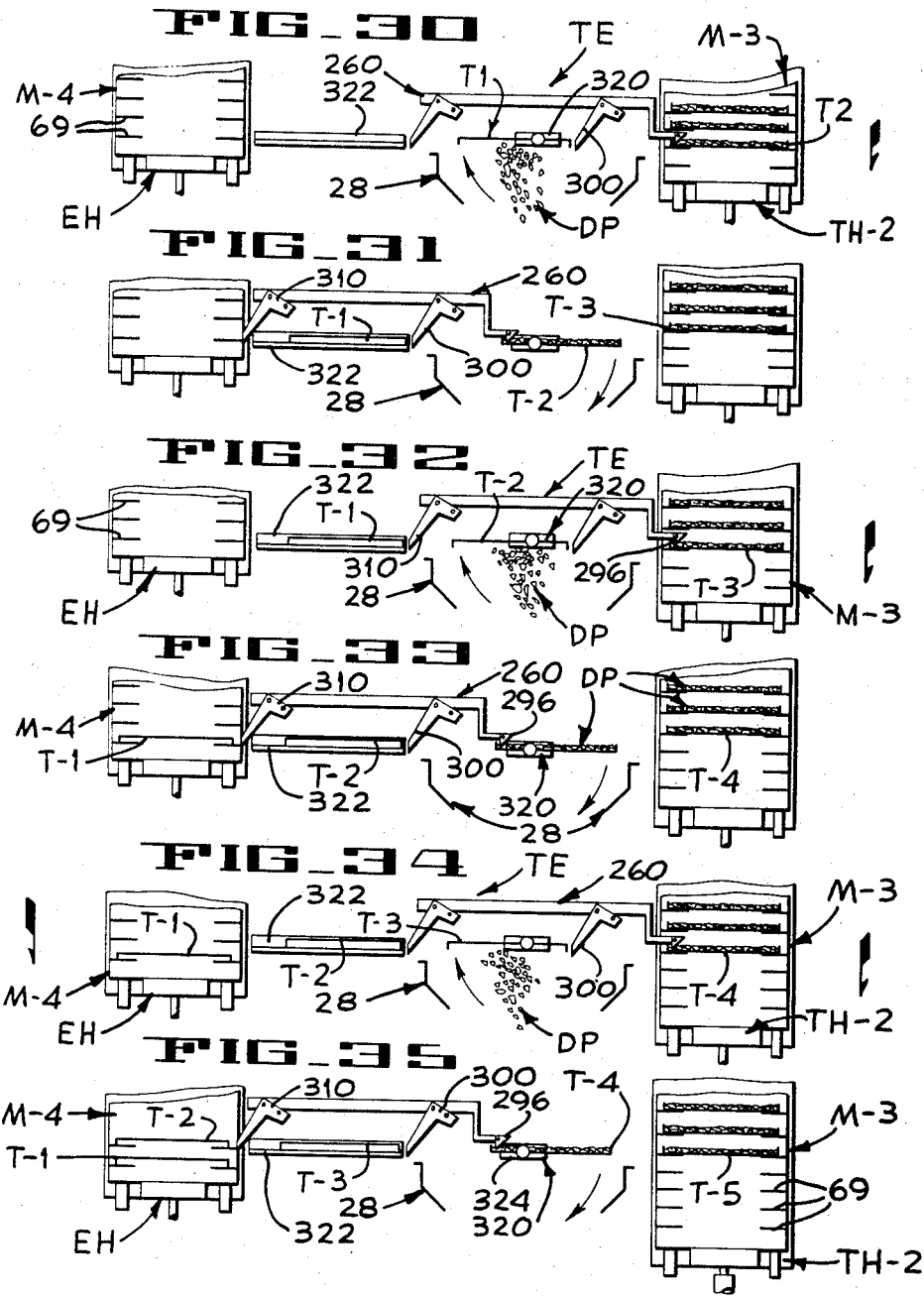

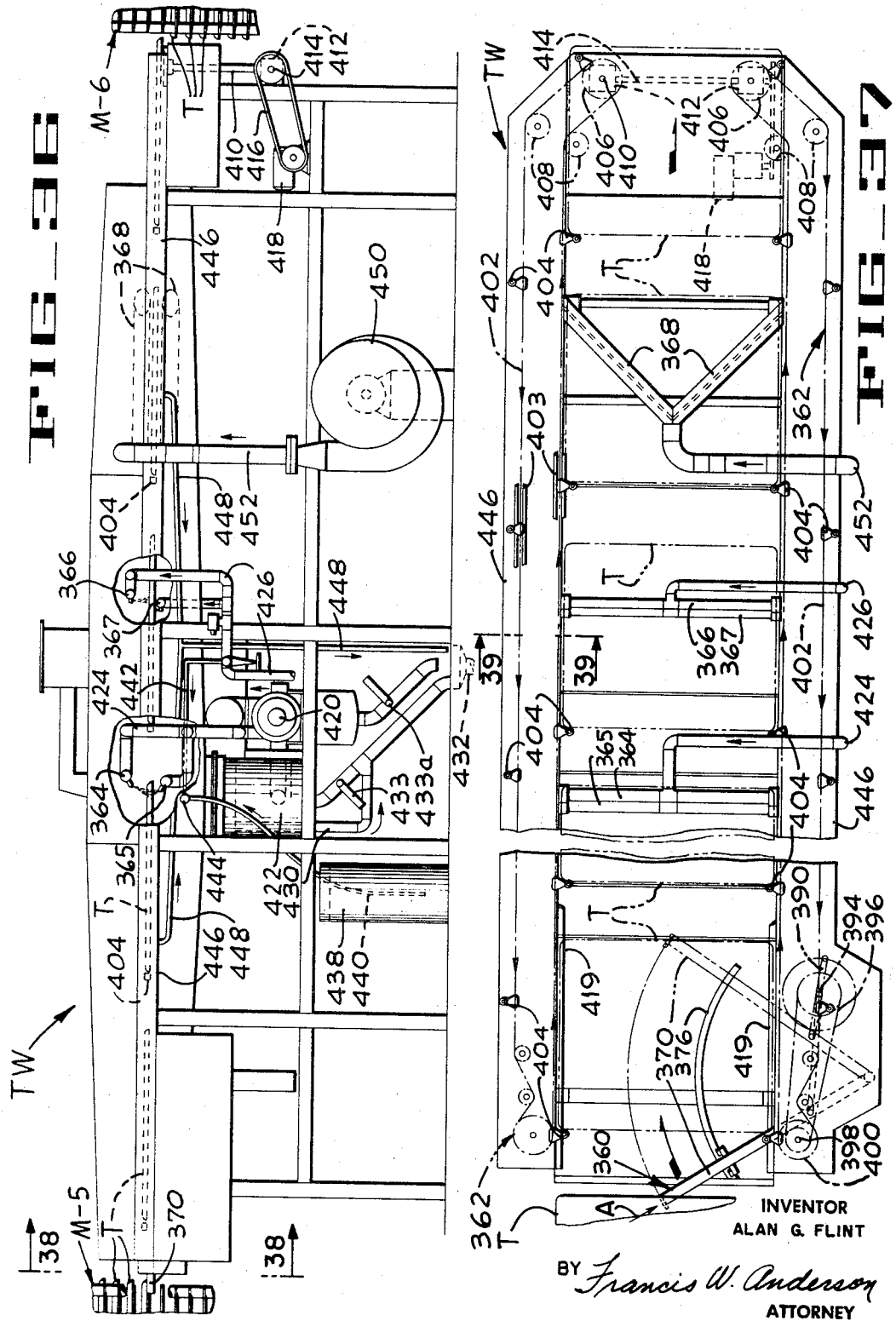

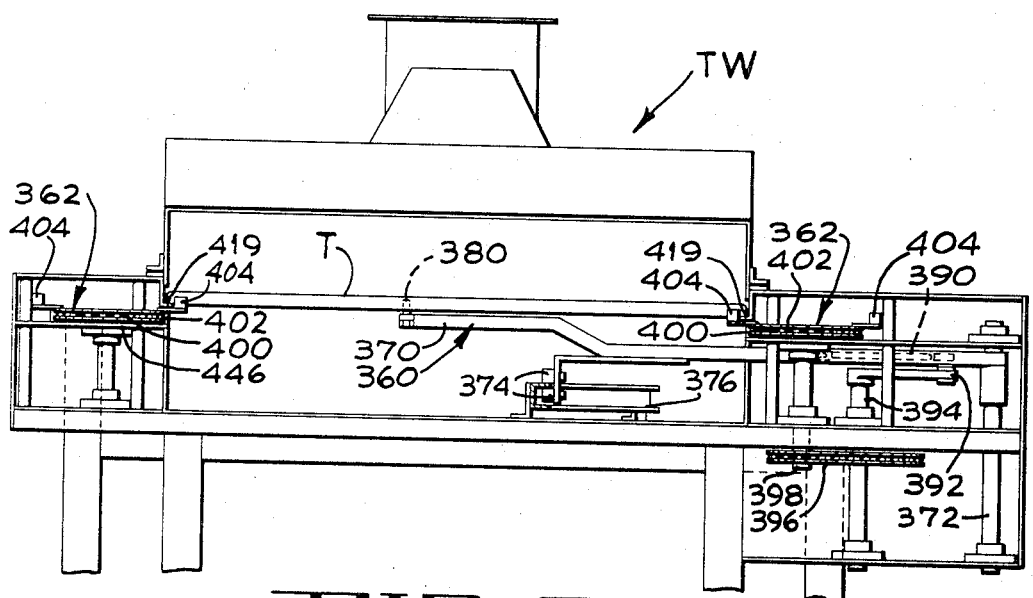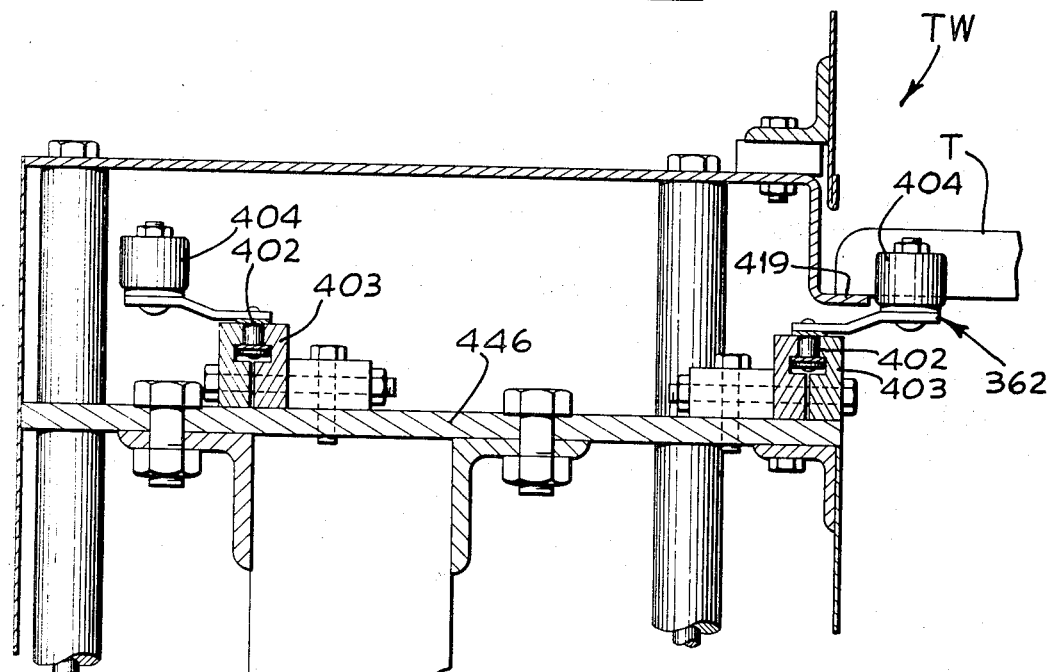

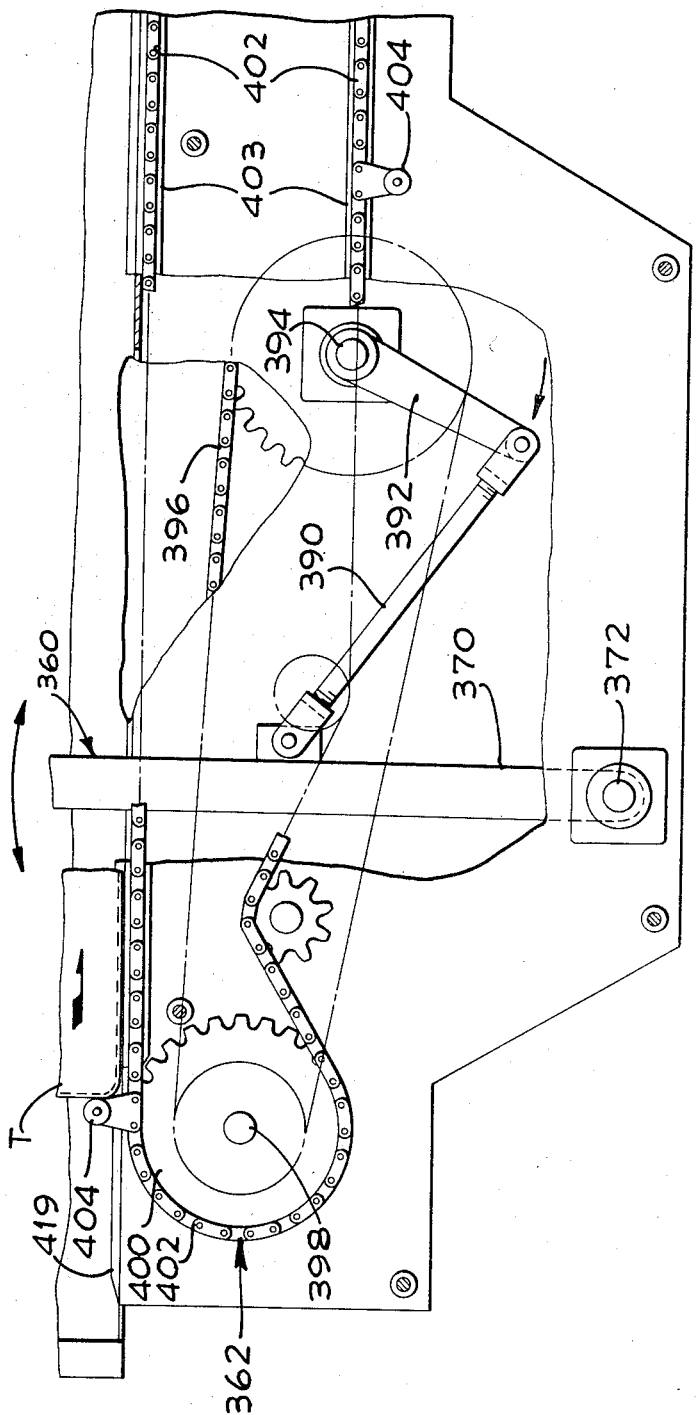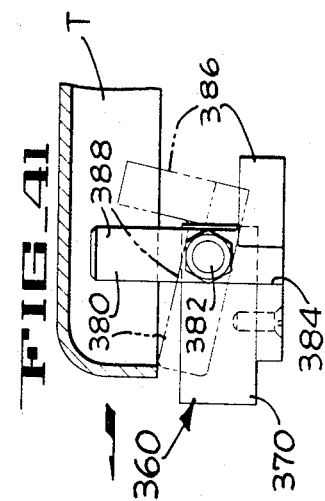

3,420,392
TRAY FILLING AND HANDLING SYSTEM
Alan G. Flint, San Jose, Calif., assignor to FMC Corporation, San Jose, Calif., a corporation of Delaware
Filed Feb. 1, 1966, Ser. No. 524,186
U.S. Cl. 214—301   17 Claims
Int. Cl. B65g 65/30

ABSTRACT OF THE DISCLOSURE

A tray filling and handling system that employs a plurality of interchangeable, modular tray racks for loading and unloading the trays at a tray washer, a tray filler, and a tray emptier. Apparatus for automatically handling trays from the receiving end of a tray filler, through the tray filler where a controlled quantity of product is deposited on the tray, and from the delivery end of the tray to a mobile shelf cart. Apparatus for filling a tray with odd-shaped particles to a substantially uniform depth comprising a hopper, a hopper mouth having a delivery opening through which the particles are fed into the tray, a reciprocating tamper to size and spread the particles and positioned adjacent the delivery opening to also act as a gate and wherein the tray moves under the delivery opening so that the tamper traverses an entire tray.

---

This invention relates to material handling and more particularly to a tray filling and handling system. The invention is particularly useful in connection with a freeze drying system and the embodiment of the invention to be described in detail incorporated in a freeze drying plant.

The term "freeze drying" is a term applied to a process for the drying or dehydration of heat-sensitive products such as foods, biologicals, or the like, without subjecting them to scorching temperatures. The products to be dried are frozen, and in case of the present invention, the frozen material is spread out into thin layers in flat trays. These trays are stacked in tiers into a drying chamber, which is closed and sealed from the atmosphere. The chamber is evacuated and the heat of sublimation is supplied to the product. The water vapor sublimes directly from the product ice cores, and is condensed on or at the drying chamber, or removed therefrom by vacuum pumps or the like. The dried product may have a moisture content as low as 1% or lower, and its temperature may never have exceeded room temperature.

In the food industry, the drying chambers are relatively large and a large number of flat trays must be spread evenly with the product to be dried, such as frozen strawberries or the like, before the trays are placed in the drying chamber. In the system of the present invention, the trays are placed in the drying chamber by a transfer vehicle such as a "shelf cart," which holds vertical rows or tiers of the filled trays and has heated shelves for supplying the heat of sublimation to the product. After the shelf cart has been loaded with filled trays, it is carried or placed in the drying chamber for the freeze drying process, as described briefly above.

There are maybe a relatively large number of trays (70 or more) measuring about three feet in each dimension, which must be filled with the frozen product. It is essential that no melting of the ice cores in the frozen product occur between the time that the product is frozen and the time that the shelf cart of trays is placed into the drying chamber. This requires that the trays be loaded in a cold room, which may have a temperature well below zero, such as −12° F., for example. It is equally important that the product be uniformly loaded and that there be no thin spots in the filling of the trays. If non-uniform filling occurs, there may be scorching at zones of the product that are spread out too thin in the trays, or else the thicker zones may not be completely dried.

Thus these criteria, namely loading at below freezing temperatures coupled with the requirement that the loading be uniform in thickness and distribution presents difficulties. A feature of the present invention is that large trays can be filed uniformly and evenly, in a cold room, without requiring manipulation of either the product or the trays by an operator. Also, the entire installation can rest on the floor—no pits for hydraulic cylinders are required.

Another feature of the present invention is that these trays can be filled at a relatively high speed. For example, a drying chamber may contain 1700 pounds of frozen product. The present invention will fill one tray 46 inches by 40 inches square and an inch deep with a frozen product such as frozen strawberries in eight seconds. In the system to be described, 72 of these trays will be loaded into a shelf cart for placement in the freeze drying chamber. This process, which formerly required five operators, can be done automatically in ten minutes or be done under the supervision of a single operator, using push button controls in that period of time.

When the products are removed from the freeze drying chamber they may be almost completely dry, that is, they may have as little as less than 1% moisture. This means that they must be packaged before they absorb any significant amount of moisture from the atmosphere, so that the tray emptying must be done in a room having a low relative humidity. This would best be accomplished by system for emptying the trays of the dried product wherein the material need not be directly handled by operators. It is a feature of the present invention that the trays of dried material leaving the freeze drying chamber can be emptied under remote control (or automatically), at a relatively high speed.

In handling of some products, such as freeze dried berries or the like, during the emptying of the dried material some of the product becomes pulverized or powdered and forms an abrasive dust, and it is not desirable that the dust be permitted to accumulate in the apparatus. Also, the dust can be utilized for formation of food products such as jellies, purees, etc. It is another feature of the present invention that the apparatus which empties the trays of the dried material can also recoup any dust released during this process.

Another feature of the present invention is that the apparatus can handle large trays loaded with a frozen product, having a loaded weight which exceeds that conveniently handled by human operators.

The manner in which these and other features of the invention may be obtained will be apparent from the following detailed description of the invention, as applied to a system used in a freeze drying plant. In the drawings:

FIGURE 1 is a schematic diagram of a system embodying the invention.

FIGURE 2 is a side elevation of a shelf cart.

FIGURE 3 is a side elevation of a hoist and module assembly at the tray filling unit.

FIGURE 4 is an end elevation of the assembly.

FIGURE 5 is a schematic diagram of the hoist control circuit.

FIGURE 6 is a plan of the tray filler.

FIGURE 6A is a side elevation of the tray filler, as viewed from line 6A—6A of FIGURE 6.

FIGURE 7 is an enlarged fragmentary section showing the tray puller.

FIGURE 8 is a fragmentary plan of the tray inverter mounting, viewed on line 8—8 of FIGURE 6A.

FIGURES 9 and 10 are enlarged vertical sections of the tamper and spreader mechanism at the tray filler.

FIGURES 11 to 20 are schematic operational diagrams of the tray filling sequence.

FIGURE 21 is a side elevation of the tray emptier.

FIGURE 22 is an end view of the same, as seen on line 22—22 of FIGURE 21.

FIGURE 23 is an end view of the same, as seen on line 23—23 of FIGURE 21.

FIGURE 24 is an enlarged plan of the tray inverter latch assembly.

FIGURE 25 is a side view of the same.

FIGURE 26 is an enlarged side elevation of the emptied tray pusher.

FIGURES 27 to 35 are simplified schematic operational diagrams showing the tray emptying sequences for several trays of dried product.

FIGURE 36 is a side elevation of the tray washer.

FIGURE 37 is a plan of the same.

FIGURE 38 is an enlarged fragmentary end view of the tray washer, looking along line 38—38 of FIGURE 36.

FIGURE 39 is an enlarged fragmentary section of the conveyor, looking along line 39—39 of FIGURE 37.

FIGURE 40 is an enlarged plan of the transfer arm drive.

FIGURE 41 is an end view of the transfer arm, looking along the arrow A, FIGURE 37.

General description

A general description of a tray filling and handling system embodying the present invention and installed in a freeze drying plant is shown schematically in FIGURE 1. The plant includes a "Cold Room" wherein the frozen product FP is loaded into the trays T, a room wherein the freeze drying chambers are installed, a "Dry Room" wherein the trays are emptied of their dried product DP, a tray washing room, and a room wherein the emptied trays are washed. The freeze drying chambers DC–1, DC–2, DC–3, etc., may be of the type shown in the patent to Abbott et al. 3,132,930, May 12, 1964, assigned to the assignee of the present invention. The details of the freeze drying installations are not critical to the present invention, so long as they are of the type which will accommodate frozen product loaded into flat trays.

The frozen product is introduced into the drying chambers in the form of a mobile unit such as a shelf cart SC–1, SC–2, SC–3, etc. These carts contain shelves for supporting the trays, which shelves can be heated in the drying chambers for supplying the heat of sublimation to the product during drying as described in the aforesaid patent. FIGURE 2 is a partial side elevation of a shelf cart SC.

In the cold room is installed a tray filler TF and associated equipment which fills the trays with the frozen product and loads the filled trays into a shelf cart SC. In some installations the product will be frozen in the drying chambers. The shelf-cart SC–1 during loading, rests on a track 10, which intersect a turntable TT–1. If desired, the shelves of the shelf cart will have been precooled by using a track 12 and a shelf cart cooler CC, all as explained in the aforesaid Abbott et al. patent. When the shelf cart SC–1 is completely loaded with trays of frozen product, the shelf cart is pushed across the turntable TT–1 onto a track 14 and onto a transfer vehicle TV. This vehicle runs on a track 16 and can be positioned in front of any drying chamber. The transfer vehicle itself has a track 18 which makes it possible to move the shelf carts across the vehicle and into and out of the drying chambers.

After the drying cycle has been completed the transfer vehicle is positioned in front of the selected drying chamber, such as chamber DC–2 in FIGURE 1. The dry chamber door is opened and the shelf cart of dried material is pulled onto the transfer vehicle. The transfer vehicle is wheeled along the track 16 to a track 20 leading to the dry room. A turntable TT–2 in this room can be set to run the shelf cart (SC–2 in FIG. 1) in position at a tray emptier TE. Here the trays T filled with dried product DP are unloaded from the shelf cart and advanced through the tray emptier TE. This path of a shelf cart through the system is shown by the long broken arrows in FIGURE 1.

Module System

It is a feature of the present invention that the trays are handled on modules, which modules may be of identical construction. These modules are indicated at M–1, M–2, etc., in FIGURE 1. M–2 appears in FIGURES 3 and 4. At the tray filler TF, a module M–1 is positioned on a supply hoist SH at the input or tray receiving end of the tray filler TF. Also, a module M–2 rests on a transfer hoist TH–1, positioned at the delivery end of the tray filler for receiving trays T filled with the frozen product FP. The hoists are substantially alike and the transfer hoist TH–1 is shown in FIGURES 3 and 4. As shown by the short solid arrows in FIGURE 1, the empty trays T are removed from the module M–1 on the supply hoist SH and advanced through the tray filler TF. Actually the trays T are upside down in the module M–1 and they are inverted after being removed from that module, as seen in FIGURE 6A which is a side elevation of the tray filler TF.

In the tray filler, the trays pass under a hopper 22 which receives the frozen product FP from a conveyor 24. A tamping and spreading mechanism, seen in FIGURE 9 and 10, fills the trays with a frozen product. The filled trays are advanced one by one onto the module M–2. When the latter module is filled with trays of frozen product, the entire tier of trays is pushed onto the shelf cart SC–1 by a shelf cart loading pusher LP.

During the tray filling cycle, the supply hoist SH and the transfer hoist TH–1 are indexed vertically step-by-step, so that one tray at a time is removed from the module M–1, filled, and loaded into the module M–2. The module M–1 is a mobile module which is brought to the supply hoist SH with the trays thereon in their inverted condition, the trays having been washed as will be described presently. The module M–2 on the transfer hoist TH–1 can also be a mobile unit, but in the system illustrated there is no need to remove it from the transfer hoist during normal operation of the system.

When a shelf cart SC–2 is removed from a drying chamber, it contains three tiers of trays T loaded with dried product DP. The shelf cart is positioned with the first tier of trays in front of an unloading pusher ULP. This pusher transfers all of the trays in the first section of the shelf cart into a module M–3 on a transfer hoist TH–2, at the input end of the tray emptier TE. The tray emptier TE removes the trays loaded with dry product DP one by one from the module M–3 and inverts them over a hopper 28 (FIG. 21) so that the dried product DP can be carried away on a conveyor 30 for packaging.

The empty, inverted trays transferred one by one to a module M–4 on an empty trays hoist EH, at the delivery end of the tray emptier TE. When the module M–4 is filled with empty inverted trays, the module is advanced, as shown by the long solid arrows, through a normally closed vestibule 32 into the room containing the tray washer TW. The module M–4 may be pushed off to one side or loaded directly onto an empty tray hoist EH–1 at the input or receiving end of the tray washer. In FIGURE 1, an extra module is shown in the system so that all machines can operate simultaneously. Thus a module M–5 is shown at the tray washer on the hoist EH–1. The empty inverted trays are removed one by one from the module M–5 (short arrows), advanced through the tray washer, washed, rinsed and dried, and advanced while in their inverted condition into a module M–6 on a washed tray hoist WH. When the module M–6 is filled with trays, (long, solid arrows), it can be wheeled into the cold room through a vestibule 34 and onto the supply hoist SH to replace the empty module M–1, previously described as being on that hoist. Thus a cycle is completed.

Shelf Cart

A fragmentary side elevation of a shelf cart SC appears in FIG. 2. The cart includes a frame 36, having wheels 37 and uprights 38 which support hollow shelves 40. The shelves are supplied with fluid connections 42, 44 for circulating hot ethylene glycol through the shelves, as in the aforesaid Abbott et al. patent. The trays T, which have been filled with the product are supported on the shelves by means of feet 46, in order that the product will be heated by radiant heat from the shelves. The shelf cart SC runs along the tracks in the plant as previously described. As mentioned, the shelf cart of the present invention holds 72 trays representing a frozen product load in the order of 1700 pounds.

Hoist and Modules

A module M–2 is shown on the transfer hoist TH–1 in FIGS. 3 and 4. The modules and the hoists are substantially identical and only one of each unit need be described. The hoist has a base 40 and a vertical post or standard 42 which slidably mounts a platform 44 by means of a vertical carriage 46. This is typical lift truck construction, and the carriage 46 is mounted by means of rollers in tracks in the hoist standard 42 (not shown) the details of this construction not being critical to the invention. The hoist platform 44 is raised and lowered by a hydraulic cylinder assembly 48 having the usual motion multiplying pulley and chain connection 50. An indexing control mechanism is built into the hoist which embodies some special limit and indexing switches mounted between the hoist post and the platform. These switches are not shown in FIGS. 3 and 4 but are indicated schematically in FIG. 5. The hoist includes a motor M and a pump P for raising and lowering the platform 44. A pivoted latch bar 52 is mounted on the upper end of the hoist carriage for receiving a pin 54 on the module. This insures proper positioning of the module on the hoist platform before loading and unloading the module.

The module M–2 includes a base 60 having caster wheels 62, plain wheels 63, and a handle 64 for moving the module from zone to zone in the plant.

Four standards 66 extend upwardly from the module base and are braced by a top plate 68. The standards support a number of partial or interrupted shelves 69, upon which the trays T rests while they are in module. The number of shelves 69 in the installation being described is 24. The shelves 69 are interrupted or partial shelves as described, for receiving the shelf cart loading pusher head LP (shown in phantom in FIG. 3), which simultaneously advances all the trays T filled with frozen product FP from the transfer hoist TH–1 to a tier of hollow shelves in the associated self cart SC–1 (FIG. 1).

Hoist indexing circuit

During a module loading and unloading cycle, the trays are either automatically removed from or loaded into a module. In the embodiment of the present invention illustrated this is accomplished by starting the cycle with the hoists supporting the paired modules in their raised position. Then as a tray is either removed from a module or loaded into a module, the hoists and module is lowered or indexed by a distance representing the vertical spacing between the shelves 69 that support the trays.

This cycle is illustrated in a semi-automatic form in that it requires only the surveillance of an operator who can see the operation and operate push button controls. Referring to FIG. 5, a hoist is indicated generally at H. In order to index the hoist platform 44 in its downward movement, a magnetically closed, vane opened reed switch 70 is mounted on the hoist platform. There are 24 of the vanes 72 as indicated by the circled numbers, there being one vane for each tray in the module. A hoist raising limit switch 74 is also on the standard 42. These switches and vanes do not appear in FIGS. 3 and 4, their mounting being a mere engineering detail. The vane switch 70 is of the type that can be opened by interruption of a magnetic field, normally present in the switch, by one of the vanes 72. This occurs at a very precise position. A typical switch is manufactured by the General Electric Company of Bloomington, Illinois, known as the Vane Switch. Other position switches may be used, and the details of the switch are not critical to the present invention.

In operation the first step is to raise the hoist to its uppermost position. This is accomplished by the operator's pressing an "UP" button 76 which starts the hoist motor M driving the hoist pump P. The limit switch 74 is a normally closed switch. Oil now passes through a line 78 opening a check valve 80, on through a line 82, a flow control valve 84, and on to the hoist cylinder 48, thereby raising the platform 44. When the platform reaches its predetermined uppermost position, the limit switch 74 is opened, shutting off the pump motor. The platform is hydraulically maintained in its raised position by the check valve 80 and by the spool 85 of an index valve 86, the valve being connected by a line 88 to the hoist cylinder line 82.

When it is desired to lower the platform one increment, the operator presses a "DOWN" button 90. This indexes a stepping switch St through one contact increment, closing one of twenty-four normally open stepping switch contacts St 1–24. There is one of these contacts for each platform position. In FIGURE 5, the platform is shown at rest at vane 21, and all stepping switches are open. When the stepping switch St is indexed by the "DOWN" button, the normally open contact St–20 will be closed by the stepping switch solenoid. Since the stepping switches St 1–21 are all in series with the normally closed vane switch 70 at the hoist, and with a solenoid 92 for the valve 86 the valve spool 85 is shifted. This brings a passageway 94 in the valve spool in communication with the line 88 and a line 96 leading by way of a check valve 98 and a line 100 to the reservoir of the hydraulic system. The hoist cylinder 48 is now opened to the reservoir, and the hoist platform is lowered under force of gravity until one of the vanes 72 which corresponds to hoist position 22, reopens the vane switch 70. This opens the circuit through the index valve solenoid 92, and the valve spool 85 is spring-returned to the position shown in FIG. 5 thereby blocking off the hoist cylinder line 88 from the reservoir. The hoist remains at position 22 until the operator presses the "DOWN" button for another indexing operation. This continues until the modules are at their lowest, or number 24 position.

Tray filler

The tray filler removes washed, upside down trays from the module M–1, inverts them, fills them with frozen product FP, and loads them into the module M–2. When the module M–2 is completely loaded, a module loading pusher LP pushes all of the filled trays into a shelf cart, as indicated in FIG. 1.

Referring to FIGS. 6 to 8. The trays are removed from the module M–1 by a combined tray puller and tray pusher carried on a reciprocating carriage 105 mounted in tracks 106 on the frame of the machine. The carriage 105 is reciprocated by means of a lever 108 connected to an ear 109 depending from the carriage by a link 110. The lever 108 oscillates about its pivot 111 by a link 112 pinned to a rotating crank 114. The crank 114 is on a shaft 115 which can be rotated continuously, or under control of an operator if desired, by conventional control mechanism not shown. The shaft 115 is driven by a right angle gear box 116 (FIG. 6) and a motor 118. An indexing drive 120 is also driven by the motor shaft 117, but this operates a tray inverting mechanism to be described presently.

In order to remove empty inverted trays from the module M–1 the carriage 105 (FIG. 6A) has a tray puller post 120 mounting a horizontally projecting finger 122, at the end of which is a pivoted hook 124. The hook 124 is urged to its upright position (FIG. 7) by means of a spring 126 which holds the hook against a stop 128. When the carriage 105 is moved to the right, as viewed in FIGS. 6A and 7, a cam surface 130 on the hook 124 slides under the lower lip of a tray T, causing the hook to pivot clear, as seen in phantom in FIG. 7. When the carriage is moved to the left, as viewed in FIGS. 6A and 7, the spring 126 brings the hook 124 to its upright position against the stop, and motion of the carriage pulls the tray out of the module M–1.

Since the washed trays are upside down in the module M–1, they must be inverted before they are filled with the frozen product. This is accomplished by an inverting unit 134, comprising laterally spaced channels 136 (FIG. 6) grooved at 138 to receive the trays T. Each channel is mounted on a stub shaft 140, and the channels are intermittently turned 180° from their normal horizontal positions, and in synchronism by means of chains 142 and a common cross shaft 144. The cross shaft 144 is driven intermittently by means of a chain and sprocket assembly 146 (FIG. 6A) and the indexing drive 120 (FIG. 6), previously described. The indexing drive, which may be of the type supplied by the Commercial Can and Machine Co. of Chicago, Illinois, under the name of Index Drive, and associated gearing are timed so that the tray receiving channels 136 remain in a horizontal position while the tray puller 120, 124 is pulling a tray from the module M–1 and into the channels.

As seen in FIG. 8, spaced by a tray width, and near each end of each channel 136, is a latch member 150. These latches are symmetrically arranged and are spring loaded to their latch position by a spring 151 and a lever 152. A tray can enter the channels by engaging a cam surface 153 and camming the latches clear. A tray is shown in phantom at the right of FIG. 8 as it would engage the cam surface. The latch is shown in its depressed position in phantom, as it is held down by a tray resting against a shoulder 153a on the right hand latch in FIG. 8. Thus the channels provide shoulders for holding the tray as the inverter is rotated, an intermediate position being indicated in phantom lines in FIG. 6. The mode of operation of these latches will be obvious from an inspection of FIG. 8, they alternatively serve as tray stops.

In order to transfer empty, right-side-up trays from the inverter channels 136 into a conveyor 160 that moves the trays under the hopper 22, a tray pusher 154 is also mounted on the carriage 105. This pusher is pivoted to the carriage at 156 and is held in its tray pushing position by a spring 157 which brings a stop 158 on the pusher against the frame. As the carriage 105 moves to the left as viewed in FIG. 6A, the pusher 154 engages the right hand edge of a tray in the channels 136 and pushes it clear of the channels into the conveyor 160. The stop 158 holds the pusher 154 upright at this time. Upon retraction, or motion of the carriage to the right as seen in FIG. 6A, the pusher 154 rides under a tray that has just been placed in the channels 136 by the hook 124, lifting the stop 158 against the force of the spring 157.

The conveyor 160 is driven continuously for advancing empty trays under the hopper 22 and into the module M–2. As seen in FIG. 6, the conveyor 160 includes a pair of endless chains 162 bearing a series of tray advancing lugs 164. The manner in which these chains 162 are mounted will be described in more detail in connection with FIG. 39, wherein a similar conveyor is fitted in the tray washer TW.

The conveyor chains 162 pass around idler sprockets 166 and drive sprockets 168 on shafts projecting from bevel gear boxes 170. The drive sprockets 168 are synchronized by a cross shaft 172 which also serves as the drive shaft. The conveyor cross shaft 172 is driven by a chain and sprocket assembly 174, a jack shaft 176, a chain and sprocket assembly 178 and the shaft 115 previously described, which also operates the crank 114 for the carriage 105.

The laterally inner reaches of the conveyor 162 (FIG. 6) are within the confines of the trays, whereas the outer reaches are outside of the trays. Thus the lugs 164, which are laterally aligned across the unit, can move in behind trays and push them under the hopper 22 and into the module M–2 (FIG. 6A), as will be described in detail presently.

The hopper 22 includes a device 180 which delivers, spreads and tamps a metered amount of frozen product to the trays as they pass thereunder filling the trays uniformly across their width and length. This is of extreme importance in freeze drying in order that the content of each tray be completely dried without scorching. Thin spots in the fill promulgate scorching, or if these are not scorched, then thick spots might not be completely dried. The successful automatic operation of the system hinges upon substantially uniform operation of the filler and spreader device 180, shown in FIGS. 9 and 10. This device is omitted from FIG. 6 for clarity.

FIG. 9 shows the device in a feed position with material feeding from hopper 22 into a tray.

FIGURE 10 shows the tamper lowered and partially obstructing further flow of the product into the tray. As the conveyor 160 pushes the trays under the hopper, the trays are supported on minor rollers 190 and major rollers 192 on the frame at each side of the trays. The latter rollers take the load imparted by the tamper. The hopper 22 has a mouth 194 or reservoir which holds a limited amount of product and which mounts a vertically adjusted spreader nozzle 196 that extends the full width of the trays. The nozzle adjustment is by means of screw and slot connections 198 (FIG. 10), for accommodation of various tray depths. A tray depth of one inch is employed in the system being described. An orifice plate 200 is adjustably mounted on the bottom of the spreader nozzle 196, and cooperates with a lip 202 of the nozzle to form an adjustable delivery opening $m$, FIG. 10. The orifice plate 200 can be adjustably positioned on the spreader nozzle 196 by means of the mounting construction, which includes substantially vertical slots 204 in the orifice plate 200, substantially horizontal slots 206 in the spreader nozzle 196, and clamp bolts 208.

Extending upstream from the delivery end of the orifice plate 200 is an apron 209, parallel to the tray bottoms. When the trailing end (not shown) of the tray approaches the tamper, the apron 209 cooperates with the tray end to confine the product and prevent the tamper from forming a bulge in the product due to the flow confining effect of the end of the tray.

A combined metering gate and reciprocating tamper 210 is provided for controlling the rate of delivery of the frozen product and for insuring that it is spread evenly at uniform thickness in the trays. The tamper includes a pair of oscillating levers 212 connected by a crossbar 213, which mounts a spring retractable tamping shoe 214. This shoe extends across the trays. It is normally held in its lowermost or projected position on the crossbar 213 by a compression spring 216, but can yield when striking hard foreign objects or obstructions, normally not present in the operation of the device. The arms 212 are pivoted to the dispenser nozzle at 218 and are vertically oscillated by a pair of links 220 pivoted to the tamper head at 222 and to a pair of cranks 226. The cranks 226 are rotated by a shaft 230 that ends across the upper frame members of the machine. The crank shaft 230 is rotated by a sprocket 232 (FIG. 6A), a chain 233, a motor sprocket 234 and an independently running tamper motor 235.

In order to cut off the flow of material from the hopper in between trays or as desired, a spring closed gate valve 240 is provided. This valve is mounted on arms 242 pivoted to the dispenser at 244 and urged to its closed position by a spring 246 (FIG. 9). A solenoid 248 is connected by a link 249 to open the valve 240 against the force of the spring 246. The solenoid 248 is controlled by the operator or by other means to insure that the product is permitted to leave the hopper only when it is to be spread into trays passing beneath the latter. In the installation being described, the trays are moved under the hopper at a rate of approximately 32 feet per minute and the tamper head 210 is oscillated at a rate of approximately 180 strokes per minute.

As can be seen in FIG. 6A, since the tray tamper is relatively wide, a link 220 and arm 212 are mounted on each side of the hopper. Only one of these assemblies appears in the figure.

As mentioned, the pusher 154 feeds the trays into position for pickup by the lugs 164 on the conveyor chains 162 (FIG. 6) and these advance the trays under the hopper and into the module M-2 on the transfer hoist TH-1, ready for transfer as a unit into the waiting open spaces in the shelf cart, SC-1 as the system stands in the diagram of FIG. 1.

The operational diagram of FIGS. 11-20 make the cycling of the tray filler clear. The controls can be automatic and synchronized with the indexing of the hoists SH and TH-1, or the control can be by push button under surveillance of an operator. These details are not critical to the invention. In these diagrams, the mechanism of the tray inverter has been omitted except the shaft 140 and the channels 136 appear. The spreading and tampering mechanism 180 has also been omitted as have all the drive machine elements.

In FIG. 11, both the supply hoist SH and the transfer hoist TH-1 are in their raised positions, and tray No. T-1, which is the lowermost tray, is ready for removal from the supply hoist. The carriage 105 is to the right as viewed in the figure, and the tray puller hook 124 is in the tray, as shown in FIG. 7. The shelves 69, as seen in FIG. 3, are actually designed to clear the hook 124 but these shelves are partially drawn in the diagrams of FIGURES 11 to 20, for purposes of orientation.

In FIG. 12, the carriage 105 has shifted to its left position, having pulled the tray T-1 into the inverter channels 136.

In FIG. 13, the carriage has advanced to the right again, the tray T-1 has been inverted, and the tray pusher 154 has slid under the tray T-1 and is now to the right of it, that is, behind it. The hoist SH has indexed down by one shelf 69.

In FIG. 14, the carriage is moved to the left and has pushed tray T-1 onto the conveyor 160. The tray hook 124, which was under a tray in FIG. 13 has, in FIG. 14, pulled the tray T-2 into the inverter channels.

While the carriage 105 is again moving to the right from the position of FIG. 14 to that of FIG. 15, the tray T-2 is inverted. The carriage is now ready to pick up the tray T-3. In the meantime, the conveyor 160 by means of the lugs 164 is advancing the tray T-1 under the hopper 22 for filling with the frozen product. The tamper mechanism 180 has been omitted from these diagrams.

In FIG. 16, the tray T-1, now full is substantially clear of the hopper. The tray T-2 has been advanced by the pusher 154 for pickup by the conveyor 160. The tray T-3 has been withdrawn from the module M-1, and is in the inverter. The tray T-4 remains in the module M-1.

In FIG. 17, the tray T-1 is being advanced into the module M-2 by the conveyor 160. The tray T-2 is being advanced under the hopper. The tray T-3 has been inverted, and the pusher 154 is now behind it. The carriage 105 which is at the right again is in position so that its hook 124 can pick up the tray T-4.

In FIG. 18, the tray T-1 has been deposited in the module M-2 by the conveyor 160. The tray T-2 has been filled and is being advanced toward the module M-2 by the conveyor. The tray T-3 has been pushed onto the conveyor 160 by the carriage pusher 154. The tray T-4 has been pulled out of the module M-1 into the inverter.

In FIG. 19, the tray T-2 is being advanced into the module M-2 by the conveyor 160. The tray T-3 is being advanced under the hopper 22 by the conveyor. The tray T-4 in the inverter has been inverted to its right-side-up position and the carriage pusher 154 is behind the tray. Tray T-5 is ready for pickup.

In FIG. 20, the module M-1 is empty and the module M-2 is loaded with filled trays. The loading pusher LP, which is hydraulically operated, can now be advanced under control of the operator to transfer all of the trays from the module M-2 into the shelf cart SC-1, as indicated in phantom lines in the figure.

As seen in FIG. 3 and as previously mentioned, the shelves 69 of the modules are interrupted to clear the loading pusher LP. All of these operations, except for the indexing operations explained in connection with FIG. 5, are readily controlled manually. However, and as mentioned, automatic control is possible if desired. This is nothing more but electrical control engineering and the details of such control are not critical to the invention.

After completion of the cycle, as shown in FIG. 20, a new module of inverted trays is brought onto the supply hoist SH. The shelf cart SC-1, if it is not already filled, is positioned to present an empty tier of shelves in front of the transfer hoist TH-1 and the cycle of FIGS. 11-20 is repeated.

*Tray emptier*

The tray emptier TE is shown in FIGURES 21-26. This machine has features common to the tray filler except that no chain conveyor is required for a filling operation and the tray inverter actually empties the trays. The tray emptier is mounted between the transfer hoist TH-2 and its transfer module M-3, and an empty tray hoist EH and its module M-4. As seen in FIGURE 1, a shelf cart SC-2 is positioned so that the unloading pusher ULP, which is merely a hydraulically operated plunger controlled by an operator, can push a tier of trays filled with dried product DP clear of the section of the shelf cart SC-2, and into the transfer module M-3.

Referring in detail to FIGURES 21 to 26 and especially to FIGURES 21, 22 and 23, which are over-all views, the tray emptier includes a reciprocating carriage 260 having a longitudinal bar 262 with laterally projecting guide pins 264 that run in longitudinal tracks 266, fixed to the frame. The bar is reciprocated by means of an arm 268 pivotally connected to a link 270 operated by an oscillating lever 272. The lever 272 is pinned to the frame at 274 and is oscillated by a link 276 pinned to a crank 278 keyed to a cross shaft 280. The cross shaft 280 is driven by a chain and sprocket assembly 282 and a stub shaft 284 projecting from a right angle gear box 286. The gear box is driven by a motor shaft 288 and a motor and gear reduction assembly 290. During a tray emptying cycle, the motor 290 and the carriage 260 are continuously operating.

In order to withdraw filled trays from the transfer module M-3 (FIGS. 21 and 26) an arm 292 projects down from the longitudinal bar 262 and has a finger 294 that projects to the right from the arm viewed in FIGURE 21. At the end of the finger 294 is a hook 296 that can slide over the edge of the trays and set in behind that edge and pull the trays out of the module. This hook is like the hook 124, FIGURE 7, in the tray filling machine.

A pusher 300 depends from the bar 262 by a pivot 302 (FIG. 21). The pusher gets behind a tray T and advances it to the left, as viewed in FIGURE 21. At this time a stop 304 on the pusher engages the bar 262 to back up the pusher finger. When the carriage 260 moves to the right, as viewed in FIGURE 21, to pick up another tray, the pusher 300 merely slides across the top of a tray that has been delivered to the inverter.

Another pusher 310 (FIGS. 21, 22 and 26) is pivotally mounted at the left end of the carriage 260, as viewed in FIGURE 21, for advancing trays after they have been inverted and emptied. The pusher 310 feeds the empty trays into the module M-4 on the empty tray hoist EH. The construction of the pushers 300 and 310 are the same, and in the form shown they are in the form of double levers that straddle the bar 262, as seen in FIGURE 22. No springs are required, because the force of gravity on these levers gives them the desired ratchet action.

A tray inverter 320 is mounted between the module M-3 and a pair of transfer channels 322 (FIGS. 21 and 22), for receiving the trays upon delivery by the hook 296 just described. The pair of transfer channels 322 (FIGS. 21 and 22) is mounted between the inverter 320 and the module M-4 (FIG. 21).

This inverter includes a pair of channels 324 each channel being mounted on a shaft 326 (FIGS. 21 and 23) driven by a chain and sprocket assembly 328. The chain and sprocket assembly is driven by a cross shaft 330, which synchronizes the two channels in their motion. The cross shaft 330 is driven by a chain and sprocket assembly 332 from a shaft 334 that projects from an indexing drive 336. The indexing drive is driven by the motor shaft 288 and causes the tray inverting channels 324 to dwell in a horizontal position for receiving trays and discharging them. The channels are turned 180° while the carriage 260 is moving to the right, after the pusher 300 has pushed the tray from the inverter onto the transfer channels 322.

In order to permit the trays to enter the inverter channels 324, and in order to keep the trays from falling out while they are being inverted, tray actuated-gravity drop latches 340 are provided at each end of the channels 324 (FIGS. 21, 24 and 25). These latches are pinned to the channels at 342, and have weighted cams 344 that have a tray retaining shoulder 346 and a cam face 348 so that the latches can be lifted by the entering trays as indicated in FIGURE 25, in phantom. The channels 324 are provided with a stop shoulder 350 (FIGS. 24 and 25) for holding the latches 340 in their tray retaining position, against gravity. These latches permit trays to enter the channels but prevent them from falling out, as will be obvious from considering FIGURE 25 with FIGURE 21 during the inversion process.

Beneath the tray emptying inverter 320 is a hopper 28 for receiving the product and delivering it to a conveyor, or any other dried product receiver, such as the conveyor 30, FIGURE 1. The hopper 28 has a vacuum header 356 and is baffled as at 358 (FIG. 21) for removing dust from the product as it falls clear of the inverter trays. The header 356 is connected to a vacuum pump or the like by means not shown in the drawings. This product dust is abrasive and its removal is desirable for this reason as well as for the fact that in many cases the dust (which is clean and pure) can be used in the preparation of other foods, such as jellies or purees, depending upon the nature of the dried product.

The cycling of the tray emptier TE and associated equipment is shown schematically in the operational diagrams of FIGURES 27 to 35. In FIGURE 27, the tray emptier is shown disposed between a transfer module M-3 on the transfer hoist TH-2 and a module M-4 on the empty tray hoist EH. To the right of module M-3, at viewed in FIGURE 27, is the shelf cart SC-4. To the right of the shelf cart is the unloading pusher ULP. The unloading pusher includes a piston and cylinder assembly 359, the piston having a plate 361 from which projects a tier of pusher fingers 363 that can extend between the shelves 40 of the shelf cart SC-4 and push out a tier of trays filled with the dry product DP into the module M-3. At this time a hoist TH-2 will be in its lower position as shown in full lines in FIGURE 27. The unloadling pusher ULP can be mechanically operated by a push button or the like by an operator controlling the process.

To start a tray emptying cycle, the modules M-3, M-4 on the hoists TH-2, EH are raised to their uppermost positions. The module M-3 is shown in phantom at its uppermost position in FIGURE 27.

In FIGURE 28 the carriage 260 has advanced fully to the right, as viewed in that figure, and the hook 296 is positioned behind the side of the lower tray T-1 in the module.

In FIGURE 29, the carriage 260 has advanced to the left, as viewed in that figure, withdrawing the tray T-1 from the module M-3 and sliding it into the channels 324 of the inverter 320.

In FIGURE 30, the inverter has inverted the tray T-1 to empty the dried product DP into the hopper 28. The carriage 260 has returned to the right to pick up the tray T-2 in the module M-3. The hoist TH-2 has been indexed or lowered by one tray spacing, as indicated by the arrow to the right of the hoist. The pusher 300 is behind the tray T-1.

In FIGURE 31, the carriage 260 has moved to the left and the pusher 300 has advanced tray T-1 into the transfer channels 322. The pusher 310 is idle. They T-2 is now in the inverted channels 324 ready for emptying.

In FIGURE 32, the carriage 260 has returned to the right leaving the tray T-1 in the transfer channels 322. The tray T-2 has been inverted and emptied into the hopper 28. The hook 296 is ready for picking up tray T-3 in the module M-3. The hoist TH-2 has indexed down one increment as indicated by the arrow at the right of the hoist. Pushers 310 and 300 are behind trays T-1 and T-2.

In FIGURE 33, the carriage has moved to the left and pusher 310 has pushed the tray T-1 from the transfer channels 322 into the module M-4. The tray T-2 has been pushed by pusher 300 from the inverter into the transfer channels 322. The tray T-3 has been pulled by the hook 296 from the module M-3 into the inverter.

In FIGURE 34, the empty tray hoist EH has been lowered one increment along with the module M-4, as indicated by the arrow to the left. The carriage has returned to the right for picking up tray T-4 in the module M-3. The tray T-2 has been left on the transfer channels 322. The tray T-3 has been inverted and emptied. The tray T-4 is still in the module M-3. The hoist TH-2 has been lowered by one increment as indicated by the arrow at the right of the hoist.

In FIGURE 35, the carriage has moved to the left pushing the inverted empty tray T-2 into the module M-4 which had been lowered by one increment as indicated by the arrow to the left of the hoist EH in FIGURE 34. The inverted empty tray T-3 has been pushed by the pusher 300 into the transfer channels 322. The tray T-4 has been pulled into the inverted channels 324 by the hook. The tray T-5 in the module M-3 is ready for removal when hoist TH-2 is lowered.

This operation continues until all of the trays have been removed from the module M-3, emptied into the hopper 28 and transferred in their inverted condition into the module M-4. When this cycle is completed, both of the hoists TH-2 and EH, along with their modules M-3, M-4, will be in their lowermost positions. The module M-4, having been loaded with inverted empty trays, can now be wheeled out of the drying room, through the vestibule 32, and into the room containing the tray washer TW.

The cycle described above is completed three times until the shelf cart SC-4 (FIG. 1) is completely emptied of trays containing dried products. The empty shelf cart can now be returned to its position occupied by the shelf cart SC-1 for reloading. If desired, the turntables TT-2 and TT-1, can be utilized to bring the empty shelf cart to the shelf cart cooler CC on tracks 12 for pre-cooling of the product heating shelves in order that the frozen product will not be thawed between the time it is loaded into the shelf cart and the shelf cart is loaded into one of the drying chambers DC. The turntable TT-2 can also be used to direct the shelf carts to a station (not shown) wherein the hot glycol is removed from the hollow shelves.

*Tray washer*

The tray washer TW is illustrated in FIGURES 36 to 41. Referring to the general views of 36, 37, the tray washer includes a swinging arm tray pickup mechanism 360 for pulling trays from the module M-5 to the washer. The trays thus removed from the module are picked up by a conveyor 362 moving continuously, which advances the trays between washing nozzles 364, 365 and rinsing nozzles 366, 367. The washed and rinsed trays are then advanced under an air drying nozzle 368 which speeds up the air drying process. The washed and dried trays are then advanced one by one by the conveyor 362 into the module M-6, which is on the washed tray hoist WH (FIG. 1). The washed and dried trays, which are in their inverted position to facilitate drainage during washing, are then advanced on the module M-6 to the supply hoist SH, for loading into the tray filler TF (FIG. 1).

The inverted, unwashed trays are picked up one by one from the module M-5 by an oscillating arm 370 pivoted to the frame at 372. The arm is guided by rollers 374 (FIG. 38) that straddle an arcuate track 376 (FIG. 37), mounted on the frame. At the end of the arm 370 a tray hook 380 is mounted (FIG. 41). This hook, as viewed along the arrow A, FIGURE 37, appears in FIGURE 41. The hook is pivoted to the end of the arm 370 by means of a pivot bolt 382, and is held against motion in one direction by a stop 384 secured to the lower end of the arm 370. A leg 386 of the hook 380 is weighted to keep the tray pulling leg 388 in its upright position, backed up by the stop 384. When the arm 370 moves to pick up a tray (motion to the right in FIG. 41, motion to the left in FIGURE 37), the upright leg 388 is knocked down by the edge of the tray as shown in phantom in FIGURE 41. After the leg 388 is within the tray, the weighted leg 386 restores the hook to its normal position so that the leg 388 can remove the tray from the module, as the arm 370 moves to the left as indicated by the motion arrow in FIGURE 41.

The tray pickup arm 370 is oscillated by a crank mechanism which is continuously driven from the conveyor 362. Referring to FIGURES 37, 38 and 40 the tray pickup arm 370 is connected by a link 390 to a crank 392 keyed to a shaft 394. The shaft 394 is driven by a sprocket and chain assembly 396 from a vertical shaft 398 which mounts the idler sprockets 400 for one of the two conveyor chains. Thus as the conveyor idler shaft 398 rotates, the tray pickup arm 370 oscillates from its left position, as viewed in FIGURE 37, for picking up a tray, to its right position shown in phantom in that figure, for leaving a tray with the conveyor 362.

The conveyor 362 includes a pair of horizontal endless chains 402. Each chain mounts tray pickup and delivery lugs 404, and as seen at the left of FIGURE 37 these lugs are synchronized so that they get behind the tray T, after it has been deposited by the swinging arm 370, and advance that tray as the lugs move along their laterally inner reaches of their respective chains. An idler sprocket 400, as previously described, is at the input end of each of the conveyor chains 402. As seen in FIGURE 39, the chains 402 ride in guides 403. The chains 402 are driven at their tray delivery ends by sprockets 406, after having passed over idlers 408. This construction brings the sprockets 406 within the lateral confines of the trays, so that when the lugs 404 are at their extreme end positions, as viewed in FIGURE 37, the lugs will also be within the lateral confines of the trays.

The drive sprockets 406 are mounted on vertical shafts 410 (FIG. 36) which project upwardly from right angle gear boxes 412 (FIG. 37). The gear boxes 412 are driven by a common cross shaft 414, which in turn is driven by a chain and sprocket assembly 416 (FIG. 36) that is continuously operated by an electric motor and gear box unit 418.

The motor 418 runs continuously during an unloading cycle, the pickup arm 370 oscillates back and forth withdrawing trays one at a time from the module M-5 and depositing them onto the rails 419 in the tray washer. The operator, where semi-automatic operation is employed, need only index the hoists with the "DOWN" button, FIGURE 5. The trays are picked up by the lugs 404 on the chains 402 of the conveyor 362 and advanced under the washing, rinsing and drying nozzles. The trays are continued on out of the tray washer and into the module M-6 by the lugs 404, as previously described.

The wash nozzles 364, 365 are supplied with water under pressure by a pump unit 420 which receives hot rinse water from a reservoir tank 422 and delivers it to the nozzles by pipes 424.

The rinse nozzles 366, 367 receive hot water directly from a hot water heater (not shown) and pipes 426. The hot rinse water is collected in a drain pan and returned to the reservoir 422. The hot rinse water is used to wash the trays initially. There will be some excess of water passing through the system, and this is removed by an overflow pipe 430 connected to a common drain 432. The reservoir 422 and the pump 420 have manually closed drain connections 433, 433a, in accordance with conventional practice.

The wash water is supplied with detergent from a detergent tank 438 and a detergent injection line 440. The injection force is supplied by a water injection line 442 leading from the hot water rinse supply line. Both the detergent and water lines connected to a detergent injector 444, of conventional design which injects the detergent into the supply lines for the wash nozzles 364, 365.

Pans 446 are provided under the conveyor chains 402 for collecting water that reaches these areas. These pans are drained by drains 448 (FIG. 36) which likewise directed drain water to the common drain 432. In order to dry the trays before they leave the tray washer, an air blower 450 is continuously running during the washing cycle, and directs air by means of a delivery pipe 452 to the V-shaped upper and lower nozzles 368 previously referred to, so that the surfaces of the trays are swept by a sheet of air to hasten the drying process and sweep some of the water from the trays into the drain.

Thus, as seen in FIGURE 1, a tray washer TW removes inserted trays from the module M-5 on the empty tray hoist EH-1 and advances them under the washing and drying apparatus to the module M-6 on the washed tray hoist WH. Before this washing cycle the two hoists will have been raised to their uppermost position, and they are indexed downwardly during the cycle, as described in connection with the diagram of FIGURE 5. When a module M-6 has been loaded with clean, dry, inverted trays, it is wheeled through the vestibule 34 into the cold room and onto the supply hoist SH, ready for supplying the tray filler TF with trays, for loading with the frozen product FP, as previously described.

Having completed a detailed description of the invention so that those skilled in the art can practice the same, I claim:

1. A tray filling and handling system comprising a tray filler, a tray filling conveyor for moving trays along said filler while product is fed into the trays, supply and transfer hoists at the respective receiving and delivery ends of said filling conveyor, an empty tray rack on said supply hoist and a filled tray rack on said transfer hoist; said tray filling conveyor having means for removing empty trays one by one from said empty tray rack, advancing them under the filler, and loading them into the full tray rack; and means for indexing said hoists during the cycle; said tray filling conveyor includes means for turning the trays over after they are removed from said empty tray rack and before they are advanced under said tray filler.

2. A tray filling and handling system comprising a tray filler, a tray filling conveyor for moving trays along said filler while product is fed into the trays, supply and transfer hoists at the respective receiving and delivery ends of said filling conveyor, an empty tray rack on said supply hoist and a filled tray rack on said transfer hoist; said tray filling conveyor having means for removing empty trays one by one from said empty tray rack, advancing them under the filler, and loading them into the full tray rack; and means for indexing said hoists during the cycle; said tray filler comprises of hopper, a hopper gate for spreading the product into the trays, and an oscillating tamper for rapidly first opening the gate and then closing it on a tamping stroke continuously as the tray passes beneath.

3. A tray filling and handling system comprising a tray filler device having means for filling trays and means for conveying trays under said filling means; a tray emptier device having means for receiving filled trays and inverting them to empty the trays; mobile shelf means positionable for receiving a tier of filled trays from said tray filler device and for supplying a tier of filled and processed trays for said tray emptier device; a plurality of mobile modules for supporting tiers of trays; said mobile shelf means having shelves spaced vertically from one another predetermined distances; said mobile modules each having shelves spaced vertically from one another the same distances as the shelves in said mobile shelf cart; hoist means for said modules at the tray receiving and delivery ends of said tray emptier and filler devices, means for indexing said hoists, means for transferring trays one by one between said modules and said devices; and means for transferring entire tiers of trays between modules at said devices and associated mobile shelf means.

4. The system of claim 3, wherein said tray filler device includes means at its receiving end for inverting upside down trays; and wherein said tray emptier device includes means for inverting right side up trays.

5. The system of claim 3, wherein said mobile modules are functionally interchangeable wheeled devices, and means are provided for precisely positioning said modules on said hoists.

6. A tray filling and handling system comprising a tray filler device having means for filling trays and means for conveying trays under said filling means; a tray emptier device having means for receiving filled trays and inverting them to empty the trays; a tray washer device; mobile shelf means positionable for receiving a tier of filled trays from said tray filler device and for supplying a tier of filled and processed trays for said tray emptier device; a plurality of mobile modules for supporting tiers of trays; said mobile modules all being of substantially similar construction so that each is interchangeable with any other; hoist means for said modules at the tray receiving and delivery ends of said tray emptier, filler and washer devices, means for indexing said hoists means; means for transferring trays one by one between said modules and said devices; and means for transferring tiers of trays between modules at said devices and the associated mobile shelf means.

7. The system of claim 6, wherein said tray filler device includes means at its receiving end for inverting upside down trays; and wherein said tray emptier device includes means for inverting right side up trays.

8. A tray filling and handling system comprising a tray filler device having means for filling trays and means for conveying trays under said filling means; a tray emptier device having means for receiving filled trays and inverting them to empty the trays; mobile shelf means positionable for receiving a tier of filled trays from said tray filler device and for supplying a tier of filled and processed trays for said tray emptier device; a plurality of mobile modules for supporting tiers of trays; said mobile modules all being of substantially similar construction so that each is interchangeable with any other; hoist means for said modules at the tray receiving and delivery ends of said tray emptier and filler devices, means for indexing said hoists, means for transferring trays one by one between said modules and said devices; and means for transferring tiers of trays between modules at said devices and the associated mobile shelf means.

9. The system of claim 8, wherein said tray filler device includes means at its receiving end for inverting upside down trays; and wherein said tray emptier device includes means for inverting right side up trays.

10. The system of claim 8, wherein means are provided for precisely positioning said modules on said hoists.

11. Apparatus for spreading a layer of particulate product on a moving surface comprising a hopper, means forming a product delivery mouth for said hopper facing in the direction of motion of said surface, and an oscillating product tamper just downstream from said mouth for simultaneously leveling the product layer and temporarily restricting the flow of product out of said mouth to provide a void for receiving newly delivered product when said tamper is raised, said hopper mouth is formed by upper and lower lips that face downstream, and an apron extends upstream from the end of said lower lip and generally parallel to the surface upon which the product is spread.

12. Apparatus for filling a tray with irregularly shaped particles comprising means for supporting a tray, means for feeding a supply of particles to said tray, tamping means mounted for substantially vertical reciprocating movement above a portion of said tray, said tray and said feeding and tamping means being mounted for movement in a substantially horizontal direction relative to each other while said tray is being filled, whereby said tamper traverses the tray covering a separate portion of the tray with each reciprocating movement and the particles in said tray are evenly sized and spread.

13. Apparatus defined by claim 12 wherein said tray is moved under said tamping and feeding means.

14. Apparatus defined by claim 12 wherein said tamping means also controls the rate of flow of material from said feeding means.

15. Apparatus defined by claim 12 wherein said feeding means includes a reservoir for holding a limited quantity of particles, said reservoir having a delivery opening therein, said tamping means being closely adjacent said delivery opening for closing-off a major area of the opening whereby it is effective to regulate the rate at which the particles are fed into the tray as well as size and spread of the particles in the tray.

16. Apparatus for filling a tray with irregularly shaped particles comprising means for supporting a tray, means for feeding a supply of particles to said tray, tamping means mounted for substantially vertical reciprocating movement above said tray, said tray and said feeding and tamping means being mounted for movement in a substantially horizontal direction relative to each other while said tray is being filled, whereby said tamper traverses the tray and the particles in said tray are evenly sized and spread, said particle feeding means includes a delivery opening facing said tamping means and further including an apron extending from said delivery opening in a direction away from said tamping means.

17. Apparatus for spreading a layer of particulate product on a moving surface comprising a hopper, means forming a product delivery mouth for said hopper facing ing the direction of motion of said surface, an oscillating product tamper just downstream of said mouth for simultaneously leveling a separate portion of the product layer with each stroke and temporarily restricting the flow of product out of said mouth to provide a void for receiving newly delivered product when said tamper is raised, and a gate valve interposed between the hopper and said tamper and adapted to move from a position adjacent the product to a position closing said mouth when spreading of product is not desired.

References Cited

UNITED STATES PATENTS

| | | | |
|---|---|---|---|
| 2,536,756 | 1/1951 | Lopez. | |
| 2,749,006 | 6/1956 | Naruro | 141—125 |
| 2,907,479 | 10/1959 | Cunningham | 214—16.6 |
| 280,478 | 7/1883 | Hunter | 141—73 X |
| 2,423,557 | 7/1947 | Gray. | |
| 2,623,676 | 12/1952 | Baker et al. | 141—131 |
| 2,718,972 | 9/1955 | Temple. | |
| 2,936,908 | 4/1960 | Carothers. | |
| 3,107,800 | 10/1963 | Gerrans | 214—311 X |

HUGO O. SCHULZ, *Primary Examiner.*

U.S. Cl. X.R.

141—73, 80; 214—16.4, 312